US012439151B2

(12) United States Patent
Dey et al.

(10) Patent No.: US 12,439,151 B2
(45) Date of Patent: Oct. 7, 2025

(54) DYNAMIC RESOURCE VOTING (DRV) ENHANCEMENTS FOR DYNAMIC FRAMES PER SECOND (FPS) USE CASES

(71) Applicant: QUALCOMM Incorporated, San Diego, CA (US)

(72) Inventors: Abhijeet Dey, Bengaluru (IN); Suresh Vankadara, Hyderabad (IN); Gaurav Jindal, Hyderabad (IN); Chandan Kumar Jha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 18/507,931

(22) Filed: Nov. 13, 2023

(65) Prior Publication Data

US 2025/0159377 A1 May 15, 2025

(51) Int. Cl.
*H04N 23/65* (2023.01)
*G06F 1/324* (2019.01)
*G06F 1/3296* (2019.01)
*H04N 23/68* (2023.01)
*H04N 23/80* (2023.01)

(52) U.S. Cl.
CPC .......... *H04N 23/651* (2023.01); *G06F 1/324* (2013.01); *G06F 1/3296* (2013.01); *H04N 23/689* (2023.01); *H04N 23/80* (2023.01)

(58) Field of Classification Search
None
See application file for complete search history.

(56) References Cited

U.S. PATENT DOCUMENTS

| 10,686,968 | B1* | 6/2020 | Wei | H04N 5/144 |
| 2009/0073300 | A1* | 3/2009 | Chung | H04N 23/651 |
| | | | | 348/E5.022 |
| 2017/0338661 | A1* | 11/2017 | Marchya | G06F 1/26 |
| 2018/0191993 | A1* | 7/2018 | Gera | H04N 23/65 |
| 2019/0204892 | A1* | 7/2019 | Wu | H04N 23/11 |
| 2019/0335089 | A1* | 10/2019 | Kadambala | G06V 10/25 |

(Continued)

FOREIGN PATENT DOCUMENTS

CN 109151323 B 6/2021

OTHER PUBLICATIONS

International Search Report and Written Opinion—PCT/US2024/047237—ISA/EPO—Dec. 2, 2024.

(Continued)

*Primary Examiner* — Paul M Berardesca
(74) *Attorney, Agent, or Firm* — Polsinelli LLP/QUALCOMM Incorporated

(57) ABSTRACT

Disclosed are systems, apparatuses, processes, and computer-readable media for image processing. For example, a computing device can output (e.g., transmit) a timing indicator for synchronization of a voting engine and a frame rate for processing image frames obtained by a sensor. The computing device can obtain a positive voting result from the voting engine based on the timing indicator. The computing device can increase a clock rate and a voltage for a power source shared by an image processor and at least one memory based on the positive voting result to produce an updated clock rate and an updated voltage. The computing device can apply the updated clock rate and the updated voltage to the image processor and the at least one memory.

28 Claims, 16 Drawing Sheets

(56) References Cited

U.S. PATENT DOCUMENTS

| | | | | |
|---|---|---|---|---|
| 2021/0120173 A1* | 4/2021 | Tanaka | ................ | H04N 23/665 |
| 2022/0345656 A1* | 10/2022 | Takano | ................ | G06F 1/3296 |
| 2023/0360166 A1* | 11/2023 | Karandikar | ............... | G06T 1/60 |
| 2024/0196113 A1* | 6/2024 | Childs | ................... | G06F 1/3296 |
| 2024/0276096 A1* | 8/2024 | Bhaskara | ................ | G06F 1/324 |

OTHER PUBLICATIONS

Wan G., et al., "Applications of Multi-Bucket Sensors to Computational Photography", Stanford Computer Graphics Laboritory Technical Report, Dec. 2012, Jan. 1, 2012, XP055412624, pp. 1-9.

* cited by examiner

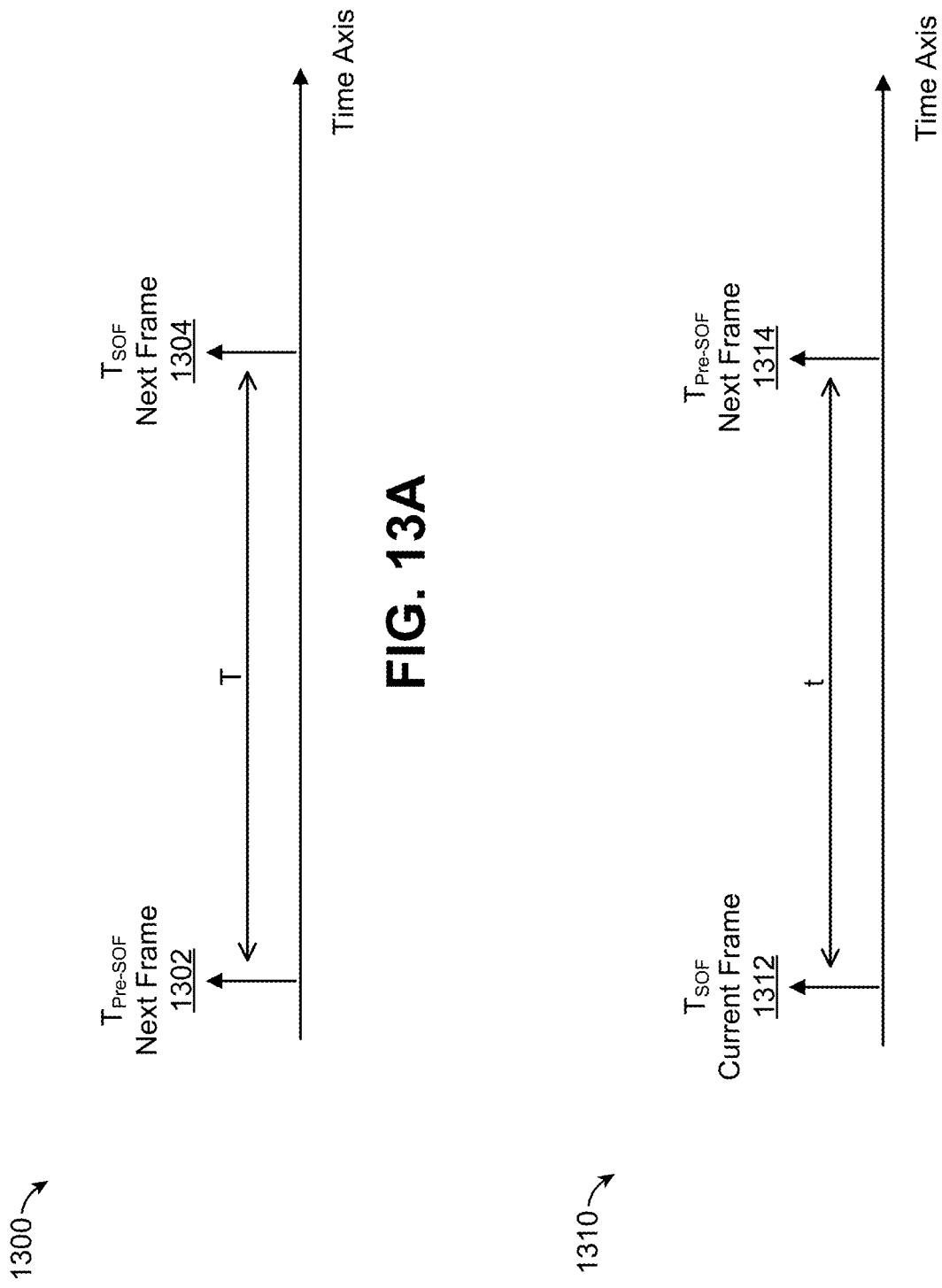

DYNAMIC RESOURCE VOTING (DRV) ENHANCEMENTS FOR DYNAMIC FRAMES PER SECOND (FPS) USE CASES

FIELD

The present disclosure generally relates to image processing. For example, aspects of the present disclosure relate to dynamic resource voting (DRV) enhancements for dynamic frames per second (FPS) use cases.

BACKGROUND

The increasing versatility of digital camera products has allowed digital cameras to be integrated into a wide array of devices and has expanded their use to different applications. For example, phones, cars, computers, televisions, and many other devices today are often equipped with camera devices. The camera devices allow users to capture images and/or video (e.g., including frames of images) from any system equipped with a camera device. The images and/or videos can be captured for recreational use, professional photography, surveillance, and automation, among other applications. Moreover, camera devices are increasingly equipped with specific functionalities for modifying images or creating artistic effects on the images. For example, many camera devices are equipped with image processing capabilities for generating different effects on captured images.

For image processing, a fast sensor readout (FSR) is a common sensor operation mode used by many original equipment manufacturers (OEMs) to improve image quality (IQ) as employing FSR can result in a decrease in rolling shutter related artifacts in the images. FSR mode allows for a faster readout of image sensor data for the image frames in comparison to a normal readout mode, while maintaining the same amount of time for exposure as the normal readout mode. The faster the readout of image sensor data performed, the lower the amount of rolling shutter related artifacts that will be present in the rendered images. FSR mode can also allow for a reduction in the required sensor power (e.g., FSR mode, in some cases, can allow for a 160 to 260 milliwatt savings in sensor power in comparison to a normal readout mode). As such, employing FSR for image processing can be advantageous from both an IQ perspective and a sensor power perspective.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, apparatuses, methods and computer-readable media for dynamic resource voting (DRV) enhancements for dynamic frames per second (FPS) use cases. According to at least one illustrative example, an apparatus for image processing is provided. The apparatus includes at least one memory and at least one processor coupled to the at least one memory and configured to: output a timing indicator for synchronization of a voting engine and a frame rate for processing image frames obtained by a sensor; obtain a positive voting result from the voting engine based on the timing indicator; increase a clock rate and a voltage for a power source shared by an image processor and the at least one memory based on the positive voting result to produce an updated clock rate and an updated voltage; and apply the updated clock rate and the updated voltage to the image processor and the at least one memory.

In another illustrative example, a method is provided for image processing. The method includes: transmitting, by a sensor to a voting engine, a timing indicator for synchronization of the voting engine and a frame rate for processing image frames obtained by the sensor; determining, by the voting engine, a positive voting result based on the timing indicator; increasing a clock rate and a voltage for a power source shared by an image processor and memory based on the positive voting result to produce an updated clock rate and an updated voltage; and applying the updated clock rate and the updated voltage to the image processor and the memory.

In another illustrative example, a non-transitory computer-readable medium is provided having stored thereon instructions that, when executed by one or more processors, cause the one or more processors to: output a timing indicator for synchronization of a voting engine and a frame rate for processing image frames obtained by a sensor; obtain a positive voting result from the voting engine based on the timing indicator; increase a clock rate and a voltage for a power source shared by an image processor and memory based on the positive voting result to produce an updated clock rate and an updated voltage; and apply the updated clock rate and the updated voltage to the image processor and the at least one memory.

In another illustrative example, an apparatus for image processing is provided. The apparatus includes: means for transmitting a timing indicator for synchronization of a voting engine and a frame rate for processing image frames obtained by a sensor; means for determining a positive voting result based on the timing indicator; means for increasing a clock rate and a voltage for a power source shared by an image processor and memory based on the positive voting result to produce an updated clock rate and an updated voltage; and means for applying the updated clock rate and the updated voltage to the image processor and the memory.

Aspects generally include a method, apparatus, system, computer program product, non-transitory computer-readable medium, user device, user equipment, wireless communication device, and/or processing system as substantially described with reference to and as illustrated by the drawings and specification.

In some aspects, one or more of the apparatuses described herein is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatus(es) can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus(es) can include an image sensor (e.g., a camera) or multiple image sensors (e.g., multiple cameras) for capturing one or more images. In some aspects, the apparatus(es) can include one or more displays for displaying one or more images, notifications, and/or other displayable data. In some aspects, the apparatus(es) can include one or more speakers, one or more light-emitting devices, and/or one or more microphones. In some aspects, the apparatus(es) can include one or more sensors. In some cases, the one or more sensors can be used for determining a location of the apparatuses, a state of the apparatus(es) (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

Other objects and advantages associated with the aspects disclosed herein will be apparent to those skilled in the art based on the accompanying drawings and detailed description.

BRIEF DESCRIPTION OF THE DRAWINGS

Illustrative aspects of the present application are described in detail below with reference to the following figures:

FIG. 13A is a diagram illustrating an example of a timing indicator for timing for a camera using DRV for a FSR for dynamic FPS use cases, where the timing indicator occurs at a time prior to a start of an image frame, in accordance with some examples.

FIG. 13B is a diagram illustrating an example of a timing indicator for timing for a camera using DRV for a FSR for dynamic FPS use cases, where the timing indicator occurs at a time after a start of an image frame, in accordance with some examples.

DETAILED DESCRIPTION

Figure 1:
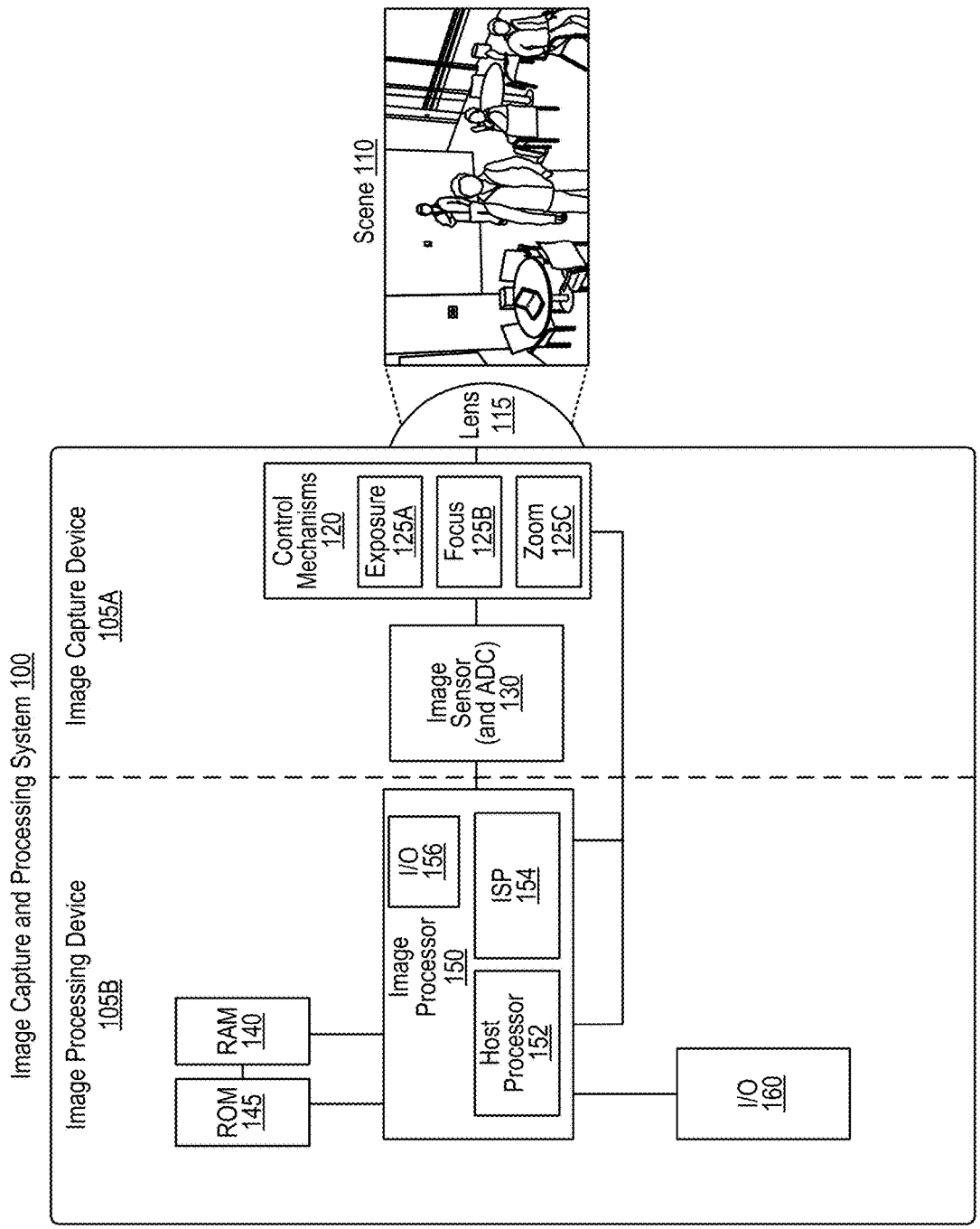
FIG. 1 is a block diagram illustrating an example architecture of an image capture and processing system, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

A camera is a device that receives light and captures image frames, such as still images or video frames, using an image sensor. The terms "image," "image frame," and "frame" are used interchangeably herein. Cameras may include processors, such as image signal processors (ISPs), that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

Cameras can be configured with a variety of image capture and image processing operations and settings. The different settings result in images with different appearances. Some camera operations are determined and applied before or during capture of the image, such as automatic exposure control (AEC) and automatic white balance (AWB) processing. Additional camera operations applied before, during, or after capture of an image include operations involving zoom (e.g., zooming in or out), ISO, aperture size, f/stop, shutter speed, and gain. Other camera operations can configure post-processing of an image, such as alterations to contrast, brightness, saturation, sharpness, levels, curves, or colors.

As previously mentioned, for image processing, FSR is a common sensor operation mode used by many OEMs to improve IQ because employing FSR can result in a decrease in rolling shutter related artifacts in the images. FSR mode allows for a faster readout of image sensor data for the image frames in comparison to a normal readout mode, while maintaining the same amount of exposure time as the normal readout mode. The faster the readout of image sensor data performed, the lower the amount of rolling shutter related artifacts that will be present in the rendered images. FSR mode can additionally allow for a reduction in the required sensor power (e.g., FSR mode, in some cases, can allow for a 160 to 260 milliwatt savings in sensor power in comparison to a normal readout mode). As such, utilizing FSR mode for image processing can be beneficial from an IQ perspective as well as a sensor power perspective.

However, FSR mode can impact power of the chipset, which may include the image signal processor (ISP). For example, FSR mode can require the ISP to operate at a very high clock rate and voltage to finish the image frame processing during the condensed readout time of FSR mode. In addition, FSR mode can require the memory (e.g., double data rate (DDR) memory) to run at a high clock rate to be able to receive the fast output of data from the image sensor processor.

Dynamic voting (e.g., dynamic resource voting (DRV)) can be employed for optimizing a fast sensor mode power (e.g., FSR mode power). Dynamic voting can be used to optimize the camera chipset, such as a system on a chip (SOC), power overhead incurred during operation of the camera in FSR mode. With conventional static clocking mechanisms, the ISP and DDR memory have a clock rate at a fixed frequency to meet the use case instantaneous performance requirements, which can result in requiring a significant power overhead throughout the use case timeline.

Dynamic voting (e.g., performed by a DRV engine) can dynamically increase (e.g., by controlling ISP and DDR voting) the ISP and DDR clock rate during a short sensor readout duration of the use case timeline, and lower the ISP and DDR clock rate immediately after the short sensor readout duration has completed (e.g., such that the clock rate is low during a large blanking interval, in the use case timeline, where no sensor readout is being performed). In adjusting the clock rate as such, the large power overhead requirement can be limited to only the sensor readout portions of the use case timeline (e.g., which is typically only 25 to 50 percent of the use case timeline).

Most camera use cases operate at a specified image frame rate configured by high level application software (SW). Dynamic voting employs a configurable hardware (HW) timer mechanism (e.g., DRV engine 830 of FIG. 8) to trigger a dynamic increase in the clock rate immediately prior to receiving a new image frame from the image sensor, and a dynamic decrease in the clock rate and shared rail voltage right after processing of the image frame has been completed. As such, dynamic voting can allow for a reduction in the chipset power overhead for FSR mode.

The existing DRV scheme operates sufficiently when the FPS is constant throughout an entire use case. However, in some cases, for example when the lighting conditions or the ambient light is changing dynamically, software (SW) typically programs the exposure ratio per frame to the sensor via a camera control interface (CCI), such as an I2C interface, to the sensor. This change in exposure ratio per frame changes the frame rate (e.g., the FPS). As such, this is an example of a use case in which the frame rate (e.g., the FPS) keeps dynamically changing, based on the ambient lighting conditions. In parallel, the SW also programs the timer value in the DRV. This timer value is programmed typically in the advanced high performance bus (AHB) interface. For proper functionality, the DRV timer value that the SW has programmed should match the corresponding frame rate, which the sensor is sending.

The sensor and the DRV are completely asynchronous hardware, and the AHB interface and the CCI are also completely asynchronous interfaces. As such, there can be a very probable chance that there can be a mismatch between the DRV timer value and the corresponding frame rate, which the sensor is sending. If this mismatch occurs, then the mismatch in the DRV timer value and the frame rate can lead to image frame drops and hardware hangs. As such, an improved technique for DRV for a FSR for dynamic FPS use cases can be beneficial.

Accordingly, systems, apparatuses, processes (also referred to as methods), and computer-readable media (collectively referred to herein as "systems and techniques") are described herein for DRV enhancements for dynamic FPS use cases. For instance, in some examples, the systems and techniques employ a timing indicator, such as a pre-start of frame (PRE-SOF) indicator, to stabilize voltage and clock levels of the ISP (e.g., an image front end (IFE) component) and DDR after an increase in the ISP and DDR clock rate and power (e.g., which are increased from a vote up of the ISP and DDR by the DRV). A sensor (e.g., of the camera) sends this timing indicator to the DRV engine. The DRV engine will vote up the ISP and the DDR, based on the timing indicator. Since the sensor sends the timing indicator to the DRV engine, both the DRV vote up and the frame rate (e.g., image frame rate) will be synchronous, which can avoid the possibility of any mismatch between the DRV timer value and the corresponding frame rate. In one or more examples, the timing indicator (e.g., the PRE-SOF) can occur at a time prior to or after a start of a frame (SOF) of a plurality of image frames that are being processed.

Additional aspects of the present disclosure are described in more detail below.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the device 105A, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1610 discussed with respect to the computing system 1600. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), neural processing units (NPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface), an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1625, read-only memory (ROM) 145/1620, a cache 1612, a memory unit 1615, another storage device 1630, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1635, any other input devices 1645, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the device 105B and one or more peripheral devices, over which the device 105B may receive data from the one or more peripheral device and/or transmit data to the one or more peripheral devices. The I/O 160 may include one or more wireless transceivers that enable a wireless connection between the device 105B and one or more peripheral devices, over which the device 105B may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past image frames.

In some examples, the host processor 152 can perform electronic image stabilization (EIS). For instance, the host processor 152 can determine a motion vector corresponding to motion compensation for one or more image frames. In some aspects, host processor 152 can position a cropped pixel array ("the image window") within the total array of pixels. The image window can include the pixels that are used to capture images. In some examples, the image window can include all of the pixels in the sensor, except for a portion of the rows and columns at the periphery of the sensor. In some cases, the image window can be in the center of the sensor while the image capture device 105A is stationary. In some aspects, the peripheral pixels can surround the pixels of the image window and form a set of buffer pixel rows and buffer pixel columns around the image window. Host processor 152 can implement EIS and shift the image window from frame to frame of video, so that the image window tracks the same scene over successive frames (e.g., assuming that the subject does not move). In some examples in which the subject moves, host processor 152 can determine that the scene has changed.

In some examples, the image window can include at least 95% (e.g., 95% to 99%) of the pixels on the sensor. The first region of interest (ROI) (e.g., used for AE and/or AWB) may include the image data within the field of view of at least 95% (e.g., 95% to 99%) of the plurality of imaging pixels in the image sensor 130 of the image capture device 105A. In some aspects, a number of buffer pixels at the periphery of the sensor (outside of the image window) can be reserved as a buffer to allow the image window to shift to compensate for jitter. In some cases, the image window can be moved so that the subject remains at the same location within the adjusted image window, even though light from the subject may impinge on a different region of the sensor. In another example, the buffer pixels can include the ten topmost rows, ten bottommost rows, ten leftmost columns and ten rightmost columns of pixels on the sensor. In some configurations, the buffer pixels are not used for AF, AE or AWB when the image capture device 105A is stationary and the buffer pixels not included in the image output. If jitter moves the sensor to the left by twice the width of a column of pixels between frames, the EIS algorithm can be used to shift the image window to the right by two columns of pixels, so the captured image shows the same scene in the next frame as in the current frame. Host processor 152 can use EIS to smoothen the transition from one frame to the next.

In some aspects, the host processor 152 can also dynamically configure the parameter settings of the internal pipelines or modules of the ISP 154 to match the settings of one or more input image frames from the image sensor 130 so that the image data is correctly processed by the ISP 154. Processing (or pipeline) blocks or modules of the ISP 154 can include modules for lens/sensor noise correction, demosaicing, color conversion, correction or enhancement/suppression of image attributes, denoising filters, sharpening filters, among others. The settings of different modules of the ISP 154 can be configured by the host processor 152. Each module may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image capture and processing system 100 may perform one or more of the image processing functionalities described above automatically. For instance, one or more of the control mechanisms 120 may be configured to perform auto-focus operations, auto-exposure operations, and/or auto-white-balance operations. In some embodiments, an auto-focus functionality allows the image capture device 105A to focus automatically prior to capturing the desired image. Various auto-focus technologies exist. For instance, active autofocus technologies determine a range between a camera and a subject of the image via a range sensor of the camera, typically by emitting infrared lasers or ultrasound signals and receiving reflections of those signals. In addition, passive auto-focus technologies use a camera's own image sensor to focus the camera, and thus do not require additional sensors to be integrated into the camera. Passive AF techniques include Contrast Detection Auto Focus (CDAF), Phase Detection Auto Focus (PDAF), and in some cases hybrid systems that use both. The image capture and processing system 100 may be equipped with these or any additional type of auto-focus technology.

Figure 2:
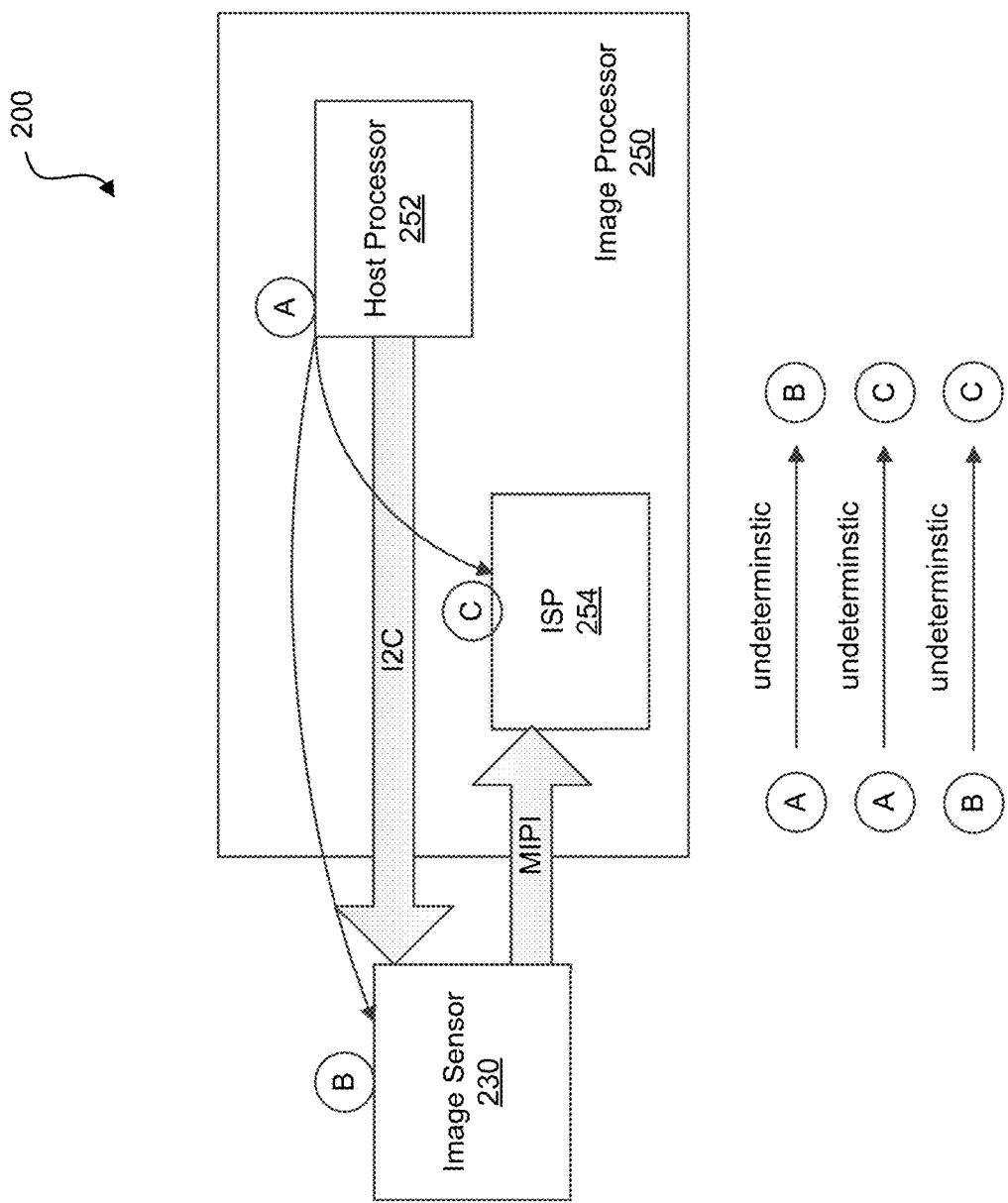
FIG. 2 is a block diagram illustrating an example of interactions between components of an image capture and processing system, in accordance with some examples.

Synchronization between the image sensor 130 and the ISP 154 is important in order to provide an operational image capture system that generates high quality images without interruption and/or failure. FIG. 2 is a block diagram illustrating an example of an image capture and processing system 200 including an image processor 250 (including host processor 252 and ISP 254) in communication with an image sensor 230. The configuration shown in FIG. 2 is illustrative of traditional synchronization techniques used in camera systems. In general, the host processor 252 attempts to provide synchronization between the image sensor 230 and the ISP 254 using fixed periods of time by separately communicating with the image sensor 230 and the ISP 254. For example, in traditional camera systems, the host processor 252 communicates with the image sensor 230 (e.g., over an I2C port) and programs the image sensor 230 parameters with a first fixed period of time, such as 2-frame periods ahead of when that image frame will be processed by the ISP 254. The host processor 252 communicates with the ISP 254 (e.g., over an internal AHB bus or other interface) and programs the ISP 254 parameter settings with a second fixed period of time, such as 1-frame period ahead of when that image frame will be processed by the ISP 254.

The image sensor 230 can send image frames to the ISP 254 (B-to-C in FIG. 2), such as over an MIPI CSI-2 PHY port or interface, or other suitable interface. However, the communication between the host processor 252 and the image sensor 230 (shown as from A to B) is undeterministic.

Similarly, the communication between the image sensor 230 and the ISP 254 (shown as from B to C) and the communication the host processor 252 and the ISP 254 (shown as from A to C) are also undeterministic. For example, there can be varying latencies in programming of the image sensor 230 and the ISP 254 by the host processor 252, which can result in a parameter settings mismatch between the sensor and the ISP. The latencies can be due to high CPU usage, congestion in one or more I/O ports, and/or due to other factors.

Figure 3:
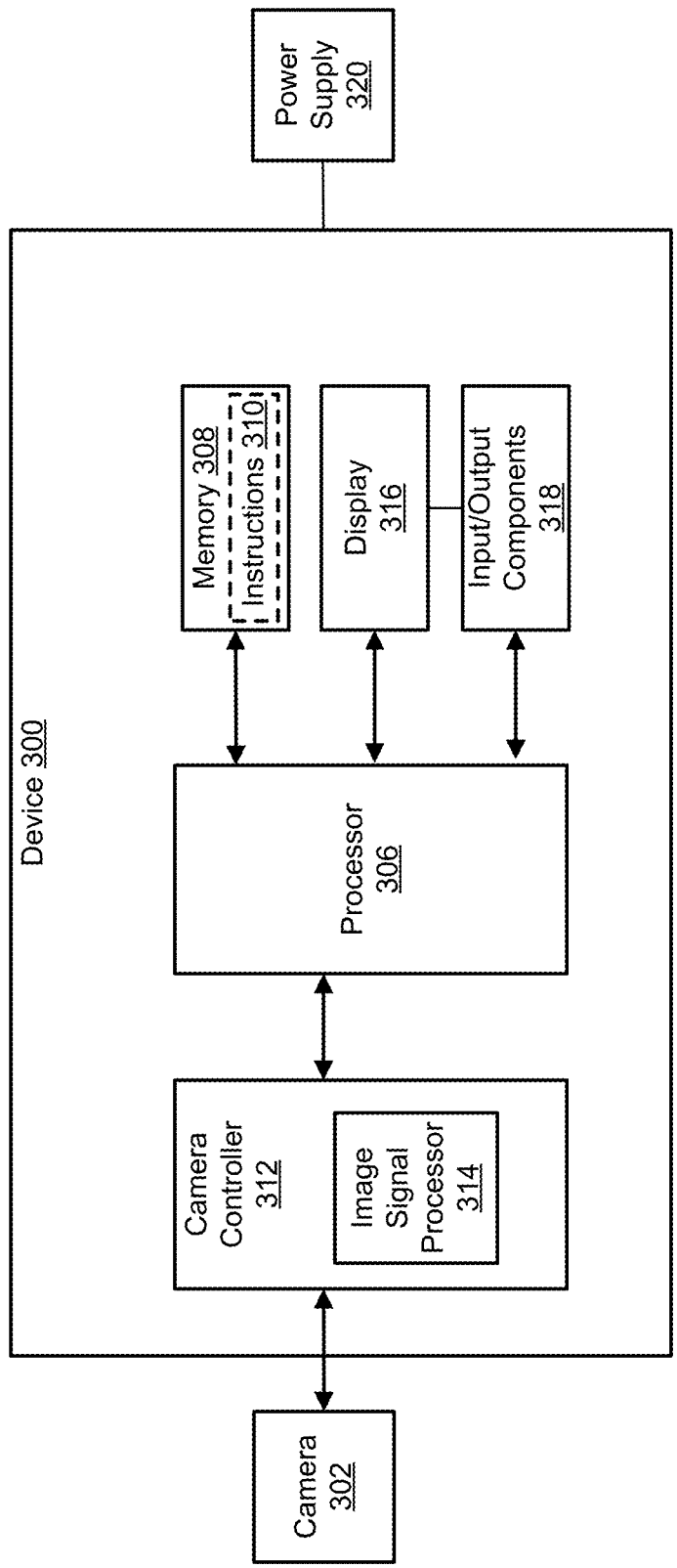
FIG. 3 is a block diagram of an example device that may be used for camera dynamic voting to optimize fast sensor mode power, in accordance with some examples.

FIG. 3 is a block diagram of an example device 300 that may be used for camera dynamic voting to optimize fast sensor mode power. Device 300 may include or may be coupled to a camera 302, and may further include a processor 306, a memory 308 storing instructions 310, a camera controller 312, a display 316, and a number of input/output (I/O) components 318 including one or more microphones (not shown). The example device 300 may be any suitable device capable of capturing and/or storing images or video including, for example, wired and wireless communication devices (such as camera phones, smartphones, tablets, security systems, smart home devices, connected home devices, surveillance devices, internet protocol (IP) devices, dash cameras, laptop computers, desktop computers, automobiles, and so on), digital cameras (including still cameras, video cameras, and so on), or any other suitable device. The device 300 may include additional features or components not shown. For example, a wireless interface, which may include a number of transceivers and a baseband processor, may be included for a wireless communication device. Device 300 may include or may be coupled to additional cameras other than the camera 302. The disclosure should not be limited to any specific examples or illustrations, including the example device 300.

Camera 302 may be capable of capturing individual image frames (such as still images) and/or capturing video (such as a succession of captured image frames). Camera 302 may include one or more image sensors (not shown for simplicity) and shutters for capturing an image frame and providing the captured image frame to camera controller 312. Although a single camera 302 is shown, any number of cameras or camera components may be included and/or coupled to device 300. For example, the number of cameras may be increased to achieve greater depth determining capabilities or better resolution for a given FOV.

Memory 308 may be a non-transient or non-transitory computer readable medium storing computer-executable instructions 310 to perform all or a portion of one or more operations described in this disclosure. Device 300 may also include a power supply 320, which may be coupled to or integrated into the device 300.

Processor 306 may be one or more suitable processors capable of executing scripts or instructions of one or more software programs (such as the instructions 310) stored within memory 308. In some aspects, processor 306 may be one or more general purpose processors that execute instructions 310 to cause device 300 to perform any number of functions or operations. In additional or alternative aspects, processor 306 may include integrated circuits or other hardware to perform functions or operations without the use of software. While shown to be coupled to each other via processor 306 in the example of FIG. 3, processor 306, memory 308, camera controller 312, display 316, and I/O components 318 may be coupled to one another in various arrangements. For example, processor 306, memory 308, camera controller 312, display 316, and/or I/O components 318 may be coupled to each other via one or more local buses (not shown for simplicity).

Display 316 may be any suitable display or screen allowing for user interaction and/or to present items (such as captured images and/or videos) for viewing by the user. In some aspects, display 316 may be a touch-sensitive display. Display 316 may be part of or external to device 300. Display 316 may comprise an LCD, LED, OLED, or similar display. I/O components 318 may be or may include any suitable mechanism or interface to receive input (such as commands) from the user and/or to provide output to the user. For example, I/O components 318 may include (but are not limited to) a graphical user interface, keyboard, mouse, microphone and speakers, and so on.

Camera controller 312 may include an image signal processor (ISP) 314, which may be (or may include) one or more image signal processors to process captured image frames or videos provided by camera 302. For example, ISP 314 may be configured to perform various processing operations for automatic focus (AF), automatic white balance (AWB), and/or automatic exposure (AE), which may also be referred to as automatic exposure control (AEC). Examples of image processing operations include, but are not limited to, cropping, scaling (e.g., to a different resolution), image stitching, image format conversion, color interpolation, image interpolation, color processing, image filtering (e.g., spatial image filtering), and/or the like.

In some example implementations, camera controller 312 (such as the ISP 314) may implement various functionality, including imaging processing and/or control operation of camera 302. In some aspects, ISP 314 may execute instructions from a memory (such as instructions 310 stored in memory 308 or instructions stored in a separate memory coupled to ISP 314) to control image processing and/or operation of camera 302. In other aspects, ISP 314 may include specific hardware to control image processing and/or operation of camera 302. ISP 314 may alternatively or additionally include a combination of specific hardware and the ability to execute software instructions.

While not shown in FIG. 3, in some implementations, ISP 314 and/or camera controller 312 may include an AF module, an AWB module, and/or an AE module. ISP 314 and/or camera controller 312 may be configured to execute an AF process, an AWB process, and/or an AE process. In some examples, ISP 314 and/or camera controller 312 may include hardware-specific circuits (e.g., an application-specific integrated circuit (ASIC)) configured to perform the AF, AWB, and/or AE processes. In other examples, ISP 314 and/or camera controller 312 may be configured to execute software and/or firmware to perform the AF, AWB, and/or AE processes. When configured in software, code for the AF, AWB, and/or AE processes may be stored in memory (such as instructions 310 stored in memory 308 or instructions stored in a separate memory coupled to ISP 314 and/or camera controller 312). In other examples, ISP 314 and/or camera controller 312 may perform the AF, AWB, and/or AE processes using a combination of hardware, firmware, and/or software. When configured as software, AF, AWB, and/or AE processes may include instructions that configure ISP 314 and/or camera controller 312 to perform various image processing and device managements tasks, including the techniques of this disclosure.

Figure 4:
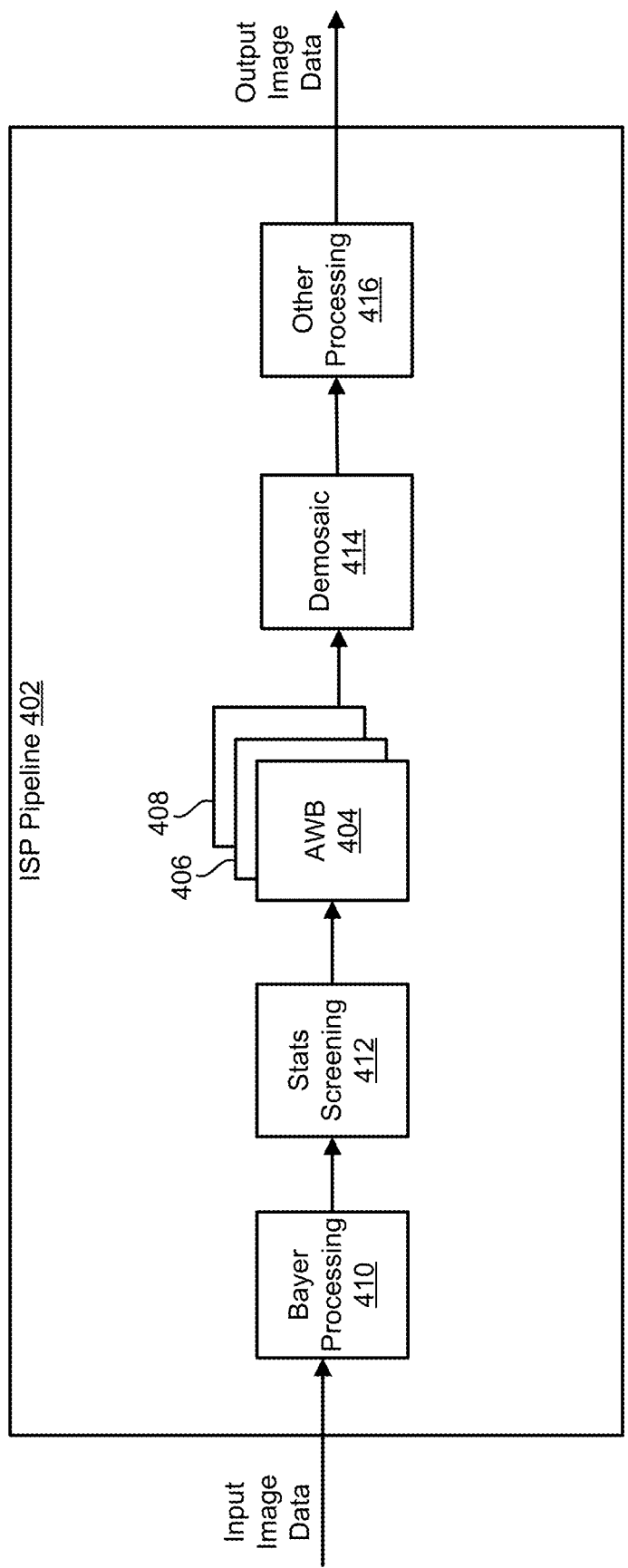
FIG. 4 is a block diagram showing the operation of an image signal processor pipeline, in accordance with some examples.

FIG. 4 is a block diagram showing the operation of an image signal processing pipeline 402 of an image signal processor (e.g., the ISP 314). For example, the ISP 314 May be configured to execute the image signal processing pipeline 402 to process input image data. The ISP 314 may receive the input image data from camera 302 of FIG. 3 and/or an image sensor (not shown) of camera 302. In some examples, such as shown in FIG. 4, the input image data may include color data of the image/frame and/or any other data (e.g., depth data). In the example of FIG. 4, the color data received for the input image data may be in a Bayer format. Rather than capturing red (R), green (G), and blue (B) values for each pixel of an image, image sensors (e.g., an image sensor of camera 302) may use a Bayer filter mosaic (or more generally, a color filter array (CFA)), where each photosensor of a digital image sensor captures a different one of the RGB colors. One example of a filter pattern for a Bayer filter mosaic may include 50% green filters, 25% red filters, and 25% blue filters.

Bayer processing unit 410 may perform one or more initial processing techniques on the raw Bayer data received by ISP 314, including, for example, subtraction, rolloff correction, bad pixel correction, black level compensation, and/or denoising.

Stats screening process 412 may determine Bayer grade or Bayer grid (BG) statistics of the received input image data. In some examples, BG statistics may include a red color to green color ratio (R/G) (which may indicate whether a red tinting exists and the magnitude of the red tinting that may exist in an image) and/or a blue color to green color ratio (B/G) (which may indicate whether a blue tinting exists and the magnitude of the blue tinting that may exist in an image). For example, the (R/G) for an image or a portion/region of an image may be depicted by equation (1) below:

$$R/G = \frac{\sum_{n=1}^{N} \text{Red}(n)}{\sum_{n=1}^{N} \text{Green}(n)} \quad (1)$$

where the image or a portion/region of the image includes pixels 1-N, each pixel n includes a red value Red(n), a blue value Blue(n), or a green value Green(n) in an RGB space. The (R/G) is the sum of the red values for the red pixels in the image divided by the sum of the green values for the green pixels in the image. Similarly, the (B/G) for the image or a portion/region of the image may be depicted by equation (2) below:

$$B/G = \frac{\sum_{n=1}^{N} \text{Blue}(n)}{\sum_{n=1}^{N} \text{Green}(n)} \quad (2)$$

In some other example implementations, a different color space may be used, such as Y'UV, with chrominance values UV indicating the color, and/or other indications of a tinting or other color temperature effect for an image may be determined.

AWB module and/or process 404 may analyze information relating to the received image data to determine an illuminant of the scene, from among a plurality of possible illuminants, and may determine an AWB gain to apply to the received image and/or a subsequent image based on the determined illuminant. White balance is a process used to try to match colors of an image with a user's perceptual experience of the object being captured. As an example, the white balance process may be designed to make white objects actually appear white in the processed image and gray objects actually appear gray in the processed image.

An illuminant may include a lighting condition, a type of light, etc. of the scene being captured. In some examples, a user of an image capture device (e.g., such as device 300 of FIG. 3) may select or indicate an illuminant under which an image was captured. In other examples, the image capture device itself may automatically determine the most likely illuminant and perform white balancing based on the determined illuminant (e.g., lighting condition). In order to better render the colors of a scene in a captured image or video, an AWB algorithm on a device and/or camera may attempt to determine the illuminants of the scene and set/adjust the white balance of the image or video accordingly.

Device 300, during the AWB process 404, may determine or estimate a color temperature for a received frame (e.g., image). The color temperature may indicate a dominant color tone for the image. The true color temperature for a scene being captured in a video or image is the color of the light sources for the scene. If the light is radiation emitted from a perfect blackbody radiator (theoretically ideal for all electromagnetic wavelengths) at a particular color temperature (represented in Kelvin (K)), and the color temperatures are known, then the color temperature for the scene is known. For example, in a Commission Internationale de l'éclairage (CIE) defined color space (from 1931), the chromaticity of radiation from a blackbody radiator with temperatures from 1,000 to 20,000 K is the Planckian locus. Colors on the Planckian locus from approximately 2,000 K to 20,000 K are considered white, with 2,000 K being a warm or reddish white and 20,000 K being a cool or bluish white. Many incandescent light sources include a Planckian radiator (tungsten wire or another filament to glow) that emits a warm white light with a color temperature of approximately 2,400 to 3,100 K.

However, other light sources, such as fluorescent lights, discharge lamps, or light emitting diodes (LEDs), are not perfect blackbody radiators whose radiation falls along the Planckian locus. For example, an LED or a neon sign emit light through electroluminescence, and the color of the light does not follow the Planckian locus. The color temperature determined for such light sources may be a correlated color temperature (CCT). The CCT is the estimated color temperature for light sources whose colors do not fall exactly on the Planckian locus. For example, the CCT of a light source is the blackbody color temperature that is closest to the radiation of the light source. CCT may also be denoted in K.

CCT may be an approximation of the true color temperature for the scene. For example, the CCT may be a simplified color metric of chromaticity coordinates in the CIE 1931 color space. Many devices may use AWB to estimate a CCT for color balancing.

The CCT may be a temperature rating from warm colors (such as yellows and reds below 3200 K) to cool colors (such as blue above 4000 K). The CCT (or other color temperature) may indicate the tinting that will appear in an image captured using such light sources. For example, a CCT of 2700 K may indicate a red tinting, and a CCT of 5000 K may indicate a blue tinting.

Different lighting sources or ambient lighting may illuminate a scene, and the color temperatures may be unknown to the device. As a result, the device may analyze data captured by the image sensor to estimate a color temperature for an image (e.g., a frame). For example, the color temperature may be an estimation of the overall CCT of the light sources for the scene in the image. The data captured by the image sensor used to estimate the color temperature for a frame (e.g., image) may be the captured image itself.

After device 300 determines a color temperature for the scene (such as during performance of AWB), device 300 may use the color temperature to determine a color balance for correcting any tinting in the image. For example, if the color temperature indicates that an image includes a red tinting, device 300 may decrease the red value or increase the blue value for each pixel of the image, e.g., in an RGB space. The color balance may be the color correction (such as the values to reduce the red values or increase the blue values).

Example inputs to AWB process 404 may include the Bayer grade or Bayer grid (BG) statistics of the received image data determined via stats screening process 412, an exposure index (e.g., the brightness of the scene of the received image data), and auxiliary information, which may include the contextual information of the scene based on the audio input (as will be discussed in further detail below), depth information, etc. It should be noted that AWB process 404 may be included within camera controller 312 of FIG. 3 as a separate AWB module.

AE process 406 may include instructions for configuring, calculating, and/or storing an exposure setting of camera 302 of FIG. 3. An exposure setting may include an amount of sensor gain to be applied, an amount of digital gain to be applied, shutter speed and/or exposure time, an aperture setting, and/or an ISO setting to use to capture subsequent images. AE process 406 may use the audio input and/or the contextual information of the scene based on the audio input to determine and/or apply exposure settings faster. It should be noted that AE process 406 may be included within camera controller 312 of FIG. 3 as a separate AE module.

AF process 408 may include instructions for configuring, calculating and/or storing an auto focus setting of camera 302 of FIG. 3. AF process 408 may determine the auto focus setting (e.g., an initial lens position, a final lens position, etc.) based on the audio input and/or the contextual information of the scene based on the audio input. It should be noted that AF process 408 may be included within camera controller 312 of FIG. 3 as a separate AF module.

Demosaic processing unit 414 may be configured to convert the processed Bayer image data into RGB values for each pixel of an image. As explained above, Bayer data may only include values for one color channel (R, G, or B) for each pixel of the image. Demosaic processing unit 414 may determine values for the other color channels of a pixel by interpolating from color channel values of nearby pixels. In some ISP pipelines 402, demosaic processing unit 414 may come before AWB, AE, and/or AF processes 404, 406, 408 or after AWB, AE, and/or AF processes 404, 406, 408.

Other processing unit 416 may apply additional processing to the image after AWB, AE, and/or AF processes 404, 406, 408 and/or demosaic processing unit 414. The additional processing may include color, tone, and/or spatial processing of the image.

As previously mentioned, for image processing, FSR is a common sensor operation mode used by many OEMs to improve IQ as employing FSR can result in a decrease in rolling shutter related artifacts in the images. FSR mode can allow for a faster readout of image sensor data for the image frames in comparison to a normal readout mode, while maintaining the same amount of exposure time as the normal readout mode. The faster the readout of image sensor data performed, the lower the number of rolling shutter related artifacts that will be present in the rendered images.

Figure 5:
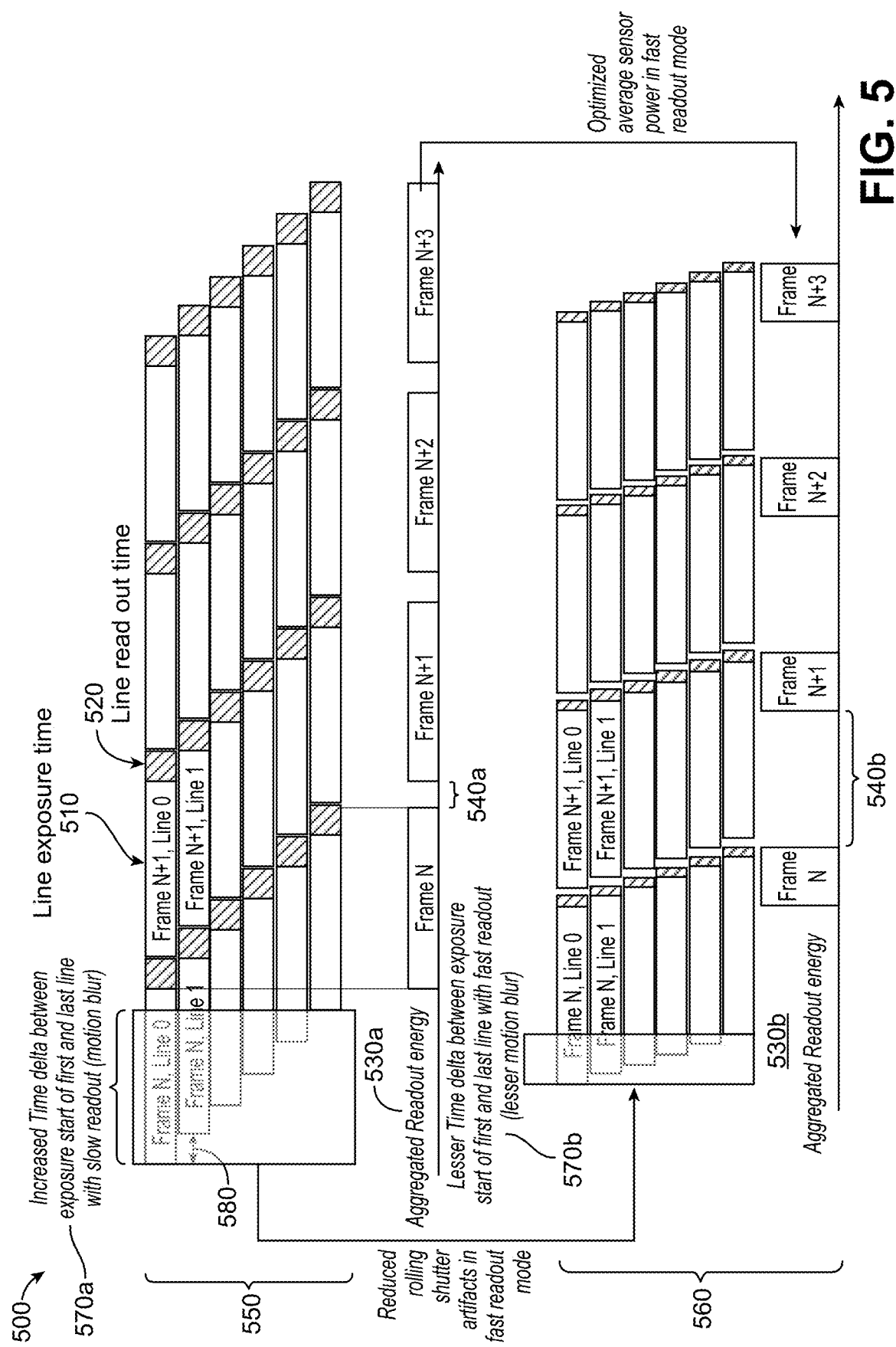
FIG. 5 is a diagram illustrating an example of camera sensor timing, in accordance with some examples.

FIG. 5 is a diagram comparing timing of FSR mode to timing of a normal readout mode. In particular, FIG. 5 is a diagram illustrating an example of camera sensor timing 500. In FIG. 5, a FSR mode timing diagram 560 is compared with a normal readout mode timing diagram 550.

Figure 8:
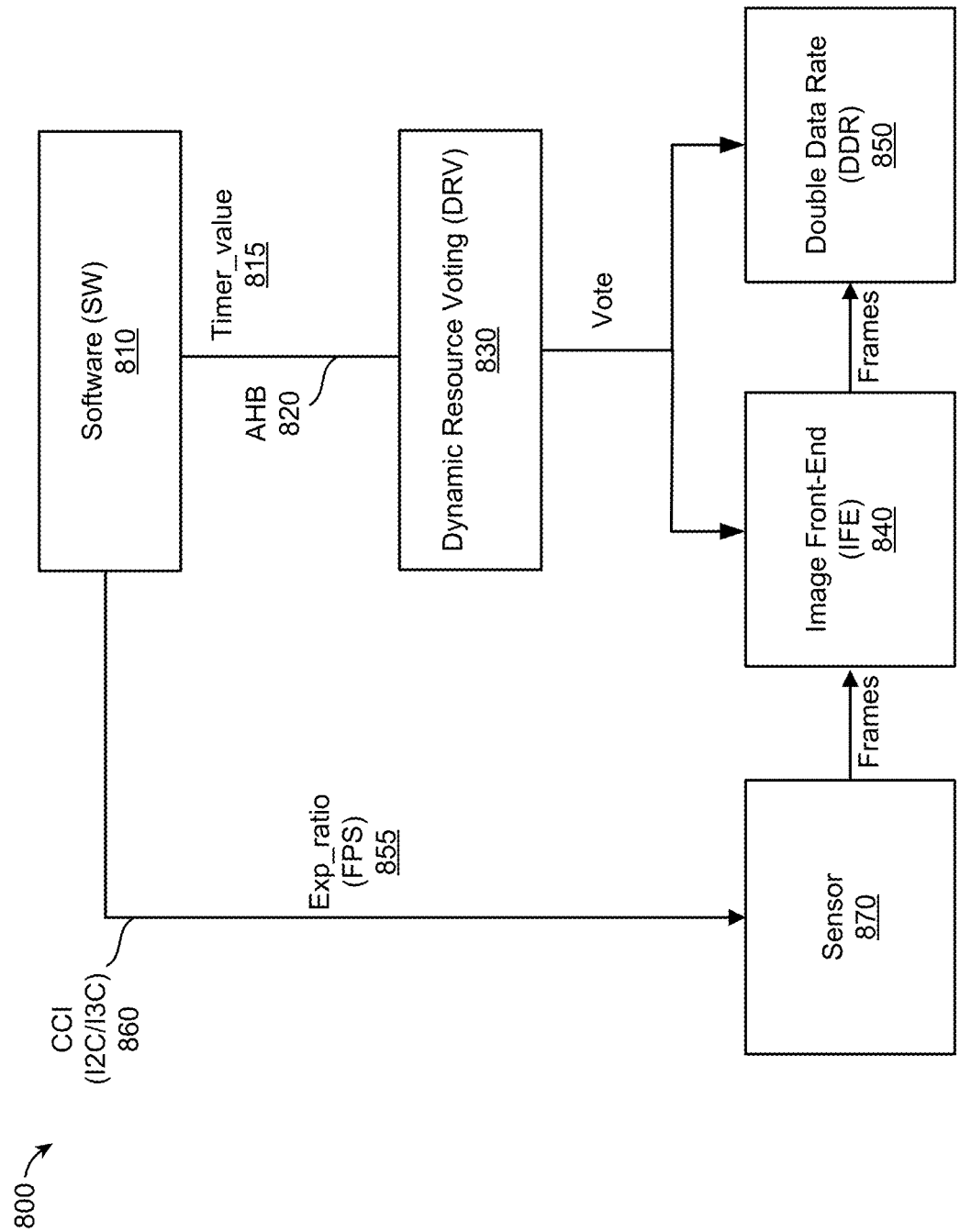
FIG. 8 is a diagram illustrating an example of a system using DRV for a fast sensor readout (FSR), in accordance with some examples.
Figure 12:
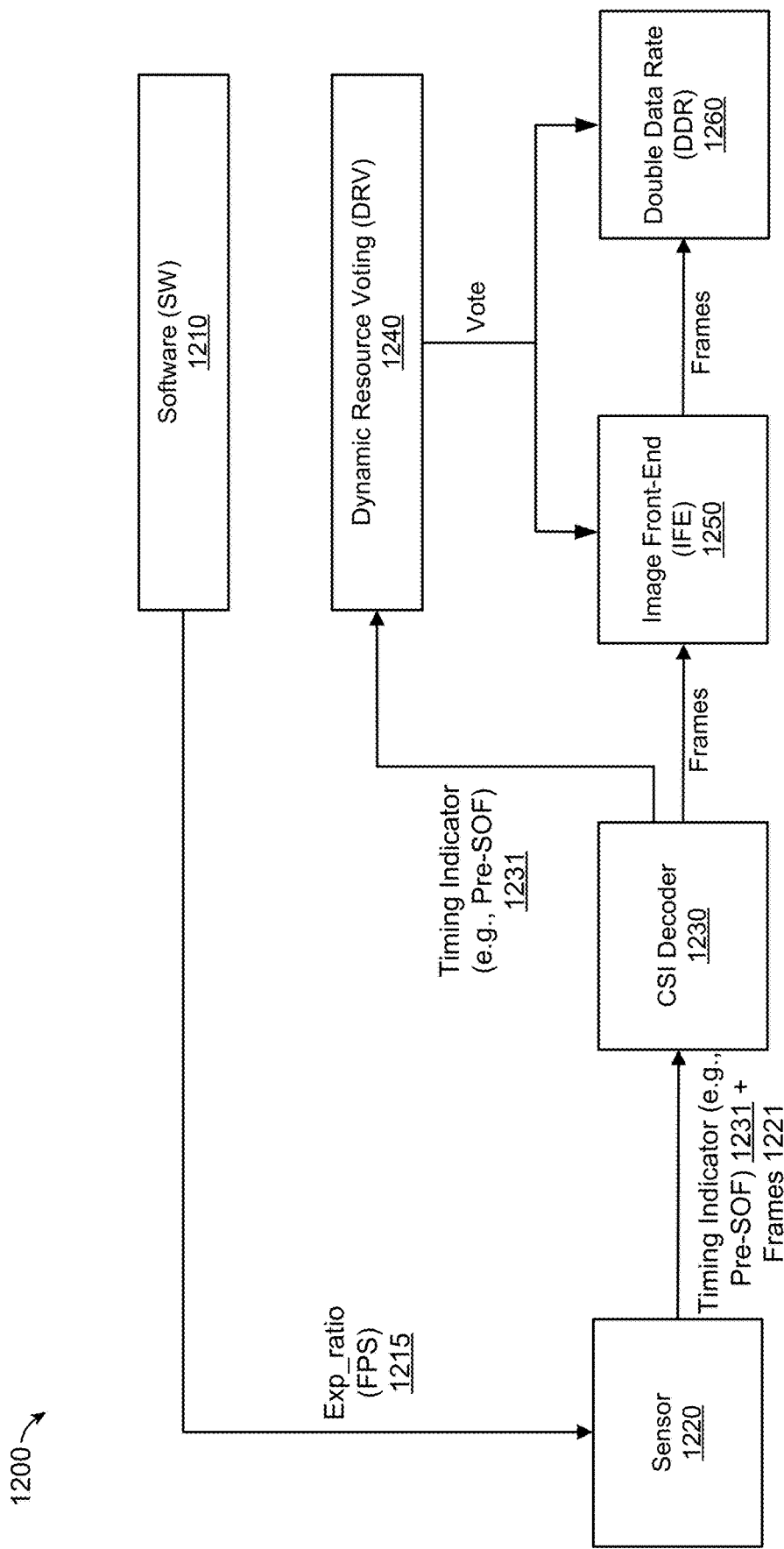
FIG. 12 is a diagram illustrating an example of a system using DRV for a FSR for dynamic frames per second (FPS) use cases, where the system employs timing that includes a timing indicator, in accordance with some examples.

In FIG. 5, the normal readout mode timing diagram 550 shows the amount of time the line is exposed (e.g., time period 510), and the amount of time the line is read out (e.g., time period 520) from one or more camera sensors (e.g., sensor 870 of FIG. 8 or sensor 1220 of FIG. 12) to the camera SOC, which can include one or more ISPs (e.g., IFE 840 of FIG. 8 or IFE 1250 of FIG. 12). So, the amount of time the line is read out (e.g., time period 520) is the exposure time for an image frame.

As shown in FIG. 5, the lines are exposed one at a time (e.g., time period 520). In the normal readout timing diagram 550, in the first row, the first line is exposed and, then, the second line is read out. And, then, the second line is exposed (e.g., time period 510) and, then, the second line is read out (e.g., time period 520).

For both the normal readout timing diagram 550 and the FSR mode timing diagram 560, the same amount of exposure time for all the lines should be maintained in the whole image frame. This exposure time occurs only at one line at a time. It is desirable to maintain the same exposure time for each line, otherwise there can be many rolling shutter artifacts present in the rendered image. For this reason, the start of the first exposure time of the line N plus one (e.g., line N+1) should be delayed by a certain amount of time after the start of the first exposure time of the previous line (e.g., line N). The start of the first exposure time of the line N plus one (e.g., line N+1) should be delayed because the readout for the previous line (e.g., line N) has not yet been completed, since the readout can only happen serially on the bus. There is only one MIPI connecting the camera sensor (e.g., sensor 870 of FIG. 8 or sensor 1220 of FIG. 12) to the SOC (e.g., including an ISP, such as IFE 840 of FIG. 8 or IFE 1250 of FIG. 12) and, as such, the readout of the sensor data is completely serialized on the bus. As such, the readout of line N and plus one (e.g., line N+1) cannot happen until the previous line (e.g., line N) readout is complete.

Since the readout of line N and plus one (e.g., line N+1) cannot happen until the previous line (e.g., line N) readout is complete, there is an offset (e.g., delta 580) in the start of the exposure time for each line. The start of the exposure time of the second line delayed by an offset (e.g., a delta 580) from the start of the exposure time of the first line, and the start of the exposure time of the third line delayed by the offset from the start of the exposure time of the second line, and so one. As the whole image frame goes through the image processing procedure, as can be seen in the normal readout timing diagram 550, there is a big lag in time (e.g., time period 570a) between the start of the exposure the first line in the image frame versus start of the exposure time of the last line in the image frame. The larger the size of this lag in time, the more rolling shutter artifacts will be present in the rendered image.

For the FSR mode timing diagram 560, the lag in time (e.g., time period 570b), which is between the start of the exposure the first line in the image frame versus start of the exposure time of the last line in the image frame, is not a large as the lag in time (e.g. time period 570a), which is between the start of the exposure the first line in the image frame versus start of the exposure time of the last line in the image frame, for the normal mode timing diagram 550. The smaller this lag in time (e.g., time period 570b), the lower the number of rolling shutter artifacts in the rendered image.

However, although the FSR mode allows for a reduction in the number of rolling shutter artifacts, there is a cost associated with employing the FSR mode. Since the FSR mode performs a fast readout of the sensor data, the MIPI signal and clock rate will need to be increased to be able to accommodate the fast readout. Currently, not all sensors can support a FSR mode. Generally, only expensive camera sensors are able to support a FSR mode. However, most premium devices are currently moving towards being able to support a FSR mode in order to reduce the number of rolling shutter artifacts in the rendered images to provide for an improved IQ.

In FIG. 5, when comparing the normal readout timing diagram 550 to the FSR mode timing diagram 560, it is evident that each of the gaps (e.g., gap 540b) in the aggregated readout energy 530b for the FSR mode timing diagram 560 are larger than each of the gaps (e.g., gap 540a) in the aggregated readout energy 530a for the normal mode timing diagram 550. As such, the FSR mode can have larger blanking periods (e.g., where one blacking period is gap 540b) than the blanking periods (e.g., where one blanking period is gap 540a) for the normal mode.

As previously mentioned, the power consumption for the FSR mode is lower than power consumption for the normal readout mode. The FSR mode can lead to a reduction in the required sensor power (e.g., in some cases, FSR mode can allow for a 160 to 260 milliwatt savings in sensor power in comparison to a normal readout mode). As such, utilizing the FSR mode for image processing, instead of the normal readout mode, can be beneficial from an IQ perspective as well as a sensor power perspective.

Figure 6:
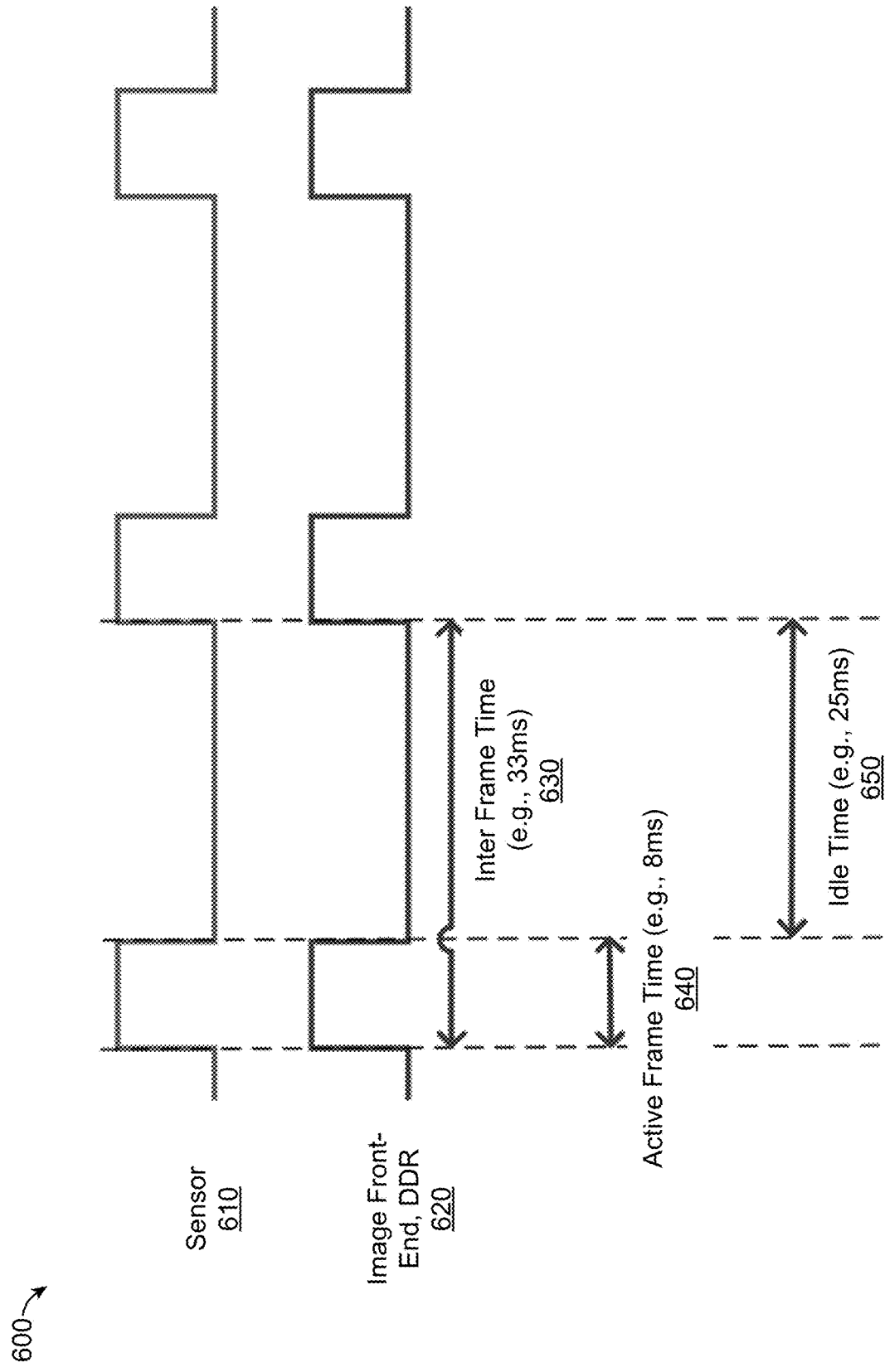
FIG. 6 is a diagram illustrating an example of timing for a camera using a fast readout sensor (FRS) mode, in accordance with some examples.

FIG. 6 is a diagram illustrating an example of timing for a camera using a FRS mode. In FIG. 6, sensor timing 610, and IFE and DDR timing 620 are shown. For FRS mode, the active frame duration, where the images and the pixels are sent, is very low as compared to the complete inter-frame period. Typically, use cases are 30 FPS use cases, where the inter-frame time 630 is the thirty-three (33) milliseconds (ms). For example, in the sensor timing 610, a first frame occurs (e.g., during the duration of the inter-frame time 630 of 33 ms), and then the subsequent frames follow, each with a duration of 33 ms. Only in the first eight (8) ms (e.g., active frame time 640) of the inter-frame time 630 is the frame itself is actually sent. The remaining twenty-five (25) ms (e.g., idle time 650) of the inter-frame time 630 is an idle period, where the sensor does not send any data.

As previously mentioned, FSR mode can impact power of the chipset, which can include the ISP. For example, FSR mode may require the ISP to operate at a very high clock rate and voltage to finish the image frame processing during the condensed readout time of FSR mode. Additionally, FSR mode can require the memory (e.g., DDR memory) to run at a high clock rate to be able to receive the fast output of data from the image sensor processor.

Dynamic voting (e.g., DRV) can be employed for optimizing a FSR mode power. Dynamic voting can be used to optimize the camera chipset (e.g., SOC) power overhead incurred during operation of the camera in FSR mode. With conventional static clocking mechanisms, the ISP and DDR memory have a clock rate at a fixed frequency to meet the use case instantaneous performance requirements, which can require a significant power overhead throughout the use case timeline.

Dynamic voting (e.g., performed by a DRV engine, such as DRV engine 830 of FIG. 8) can dynamically increase (e.g., by controlling ISP and DDR voting) the ISP and DDR clock rate during a short sensor readout duration of the use case timeline, and lower the ISP and DDR clock rate immediately after the short sensor readout duration has completed (e.g., such that the clock rate is low during a large blanking interval, in the use case timeline, where no sensor readout is being performed). In adjusting the clock rate as such, the large power overhead requirement may be limited to only the sensor readout portions of the use case timeline, which is typically only 25 to 50 percent of the use case timeline.

Most camera use cases operate at a specified image frame rate configured by high level application SW. Dynamic voting employs a configurable HW timer mechanism (e.g., DRV engine 830 of FIG. 8) to trigger (e.g., via a vote up) a dynamic increase in the clock rate immediately prior to receiving a new image frame from the image sensor, and trigger (e.g., via a vote down) a dynamic decrease in the clock rate and shared rail voltage right after processing of the image frame has been completed. Therefore, dynamic voting can reduce the chipset power overhead for FSR mode.

Figure 7:
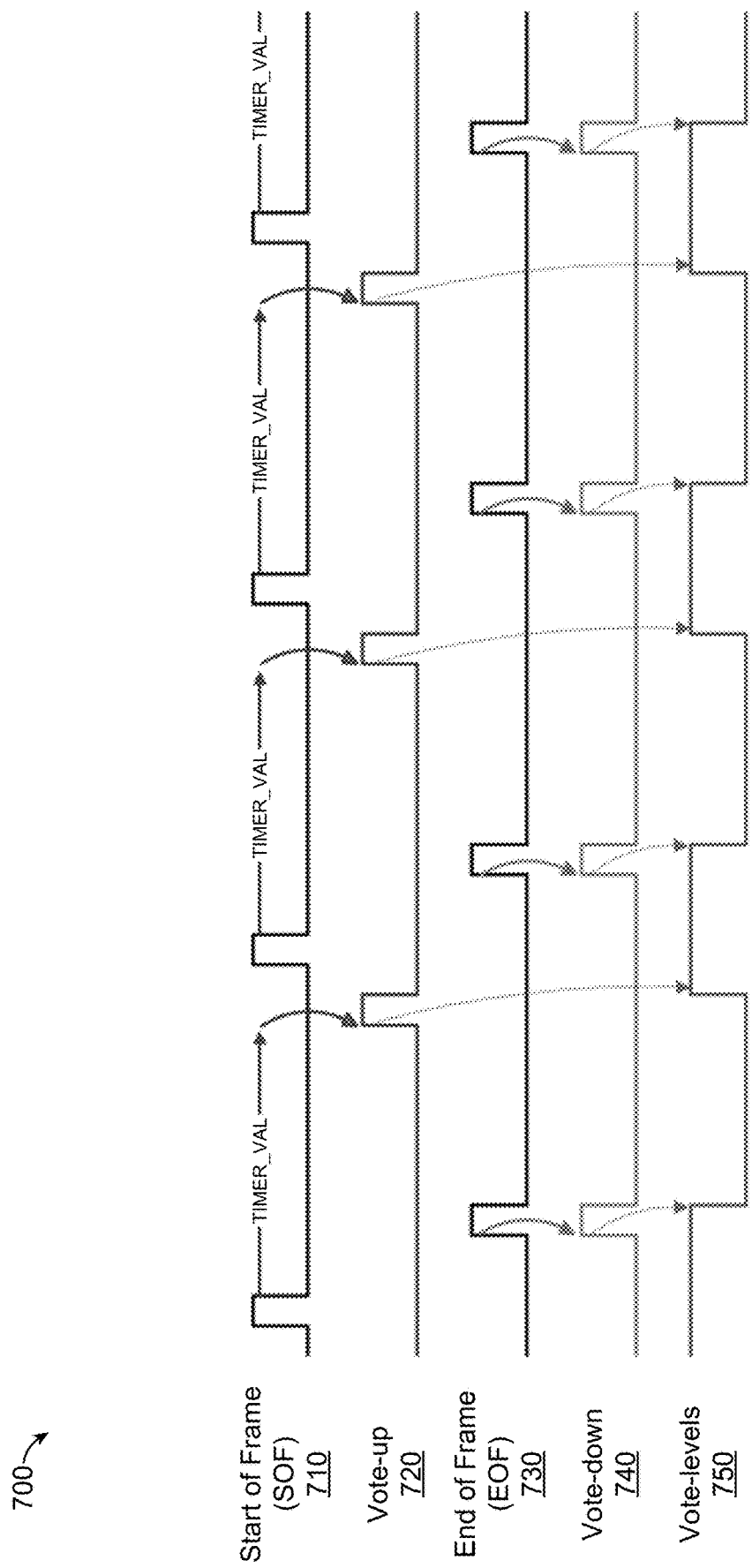
FIG. 7 is a diagram illustrating an example of timing for a camera using dynamic resource voting (DRV) for FRS use cases, in accordance with some examples.

FIG. 7 is a diagram illustrating an example of timing for a camera using DRV for FRS use cases. In FIG. 7, start of frame (SOF) timing 710, vote up timing 720, end of frame (EOF) timing 730, vote down timing 740, and vote levels timing 750 are shown.

In FRS uses cases, the DRV is used to reduce the SOC power by controlling the ISP (e.g., IFE) and DDR vote. SW can configure a DRV timer (e.g., TIMER_VAL in SOF timing 710) at the beginning of each use case. The timer (e.g., TIMER_VAL) can start counting at each SOF (e.g., each SOF is denoted by each pulse of the SOF timing 710). When the timer (e.g., TIMER_VAL) expires, there is a vote up (e.g., each vote up is denoted by each pulse of the vote up timing 720) of the IFE and DDR resources, such that the IFE and DDR resources are ready to receive the next SOF.

The vote levels (e.g., as shown in the vote levels timing 750) of the resources will go up and down, based on the vote ups (e.g., pulses) in the vote up timing 720 and the vote downs (e.g., pulses) in the vote down timing 740. As such, when the timer (e.g., TIMER_VAL) expires, the vote level of the vote levels timing 750 goes up. As such, when the next SOF arrives in the SOF timing 710, the IFE and DDR resources are ready to accept the data.

When an EOF (e.g., each EOF is denoted by each pulse of the EOF timing 730) is received, there is a corresponding vote down (e.g., each vote down is denoted by each pulse of the vote down timing 740) of the IFE and DDR resources to conserve power. When there is a vote down in the vote down timing 740, the vote level of the vote levels timing 750 will go down.

In summary, the vote level of the vote levels timing 750 goes up when the timer (e.g., TIMER_VAL) of the SOF timing 710 expires. When an EOF in the EOF timing 730 occurs, there is a corresponding vote down in the vote down timing 740 and, as such, the vote level of the vote level timing 750 goes down, and this cycle keeps repeating.

FIG. 8 is a diagram illustrating an example of a system 800 using DRV for a fast sensor readout (FSR). In FIG. 8, the system 800 is shown to include SW 810, an AHB interface 820, a DRV engine 830, an IFE 840, a DDR 850, a CCI 860 (e.g., an I2C or I3C interface), and a sensor 870.

The existing DRV scheme can operate sufficiently when the FPS is constant throughout an entire use case. However, in some cases, for example when the lighting conditions or the ambient light is changing dynamically, SW 810 typically programs the exposure ratio per frame 855 (e.g., Exp_ratio) to the sensor via the CCI 860 (e.g., an I2C interface) to the sensor 870. This change in exposure ratio per frame 855 changes the frame rate (e.g., the FPS). This is an example of a use case in which the frame rate (e.g., the FPS) keeps dynamically changing, based on the ambient lighting conditions. In parallel, the SW 810 also programs the timer value 815 (e.g., Timer_value) in the DRV 830. This timer value 815 is programmed in the AHB interface 820. For proper functionality, the DRV timer value 815 that the SW 810 has programmed should match the corresponding frame rate, which the sensor 870 is sending.

The sensor 870 and the DRV 830 are completely asynchronous hardware, and the AHB interface 820 and the CCI 860 are also completely asynchronous interfaces. As such, there can be a very probable chance that there can be a mismatch between the DRV timer value 815 and the corresponding frame rate, which the sensor 870 is sending. If this mismatch occurs, then the mismatch in the DRV timer value 815 and the frame rate can lead to image frame drops and hardware hangs.

Figure 9:
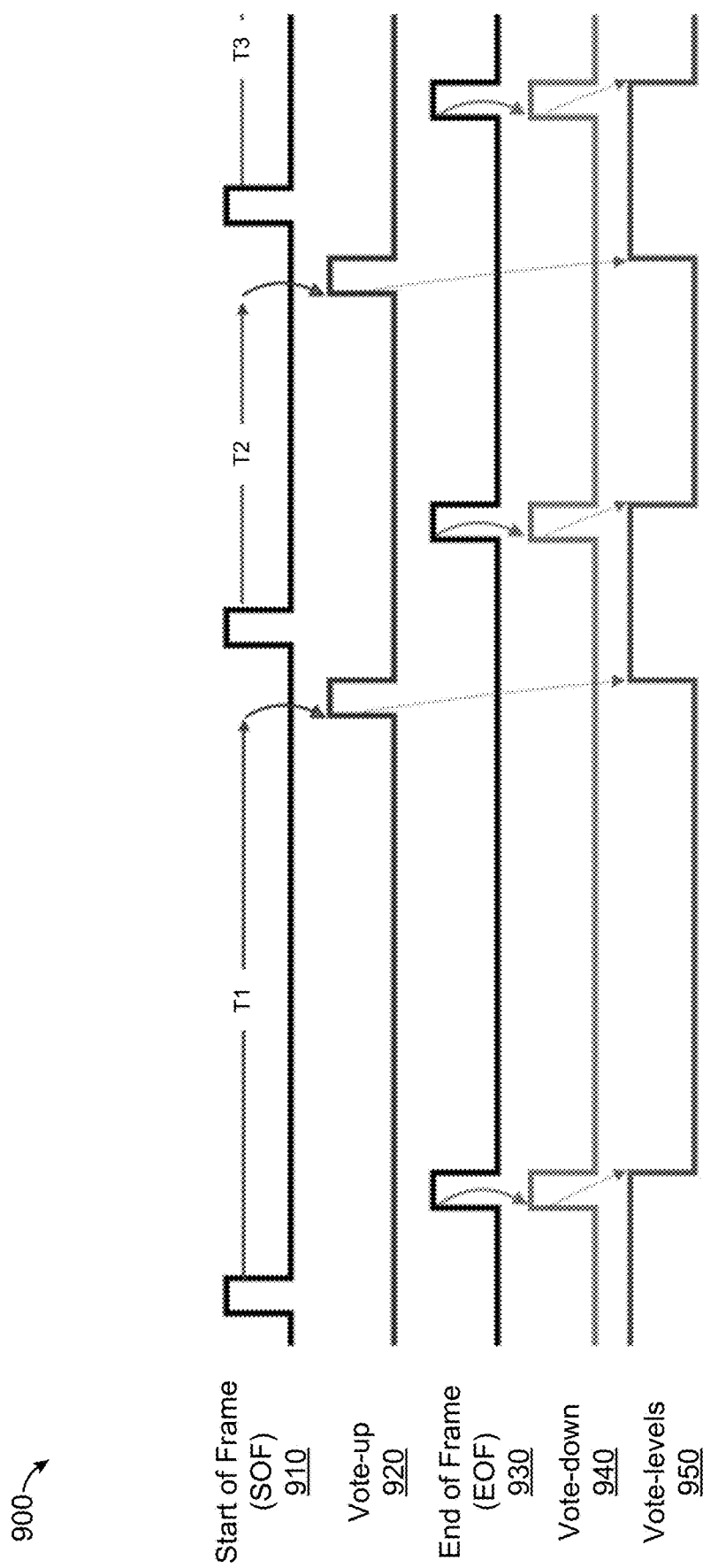
FIG. 9 is a diagram illustrating an example of timing for a camera using DRV for an FRS use case, where the DRV timer value and the frame rate are synchronous, in accordance with some examples.
Figure 10:
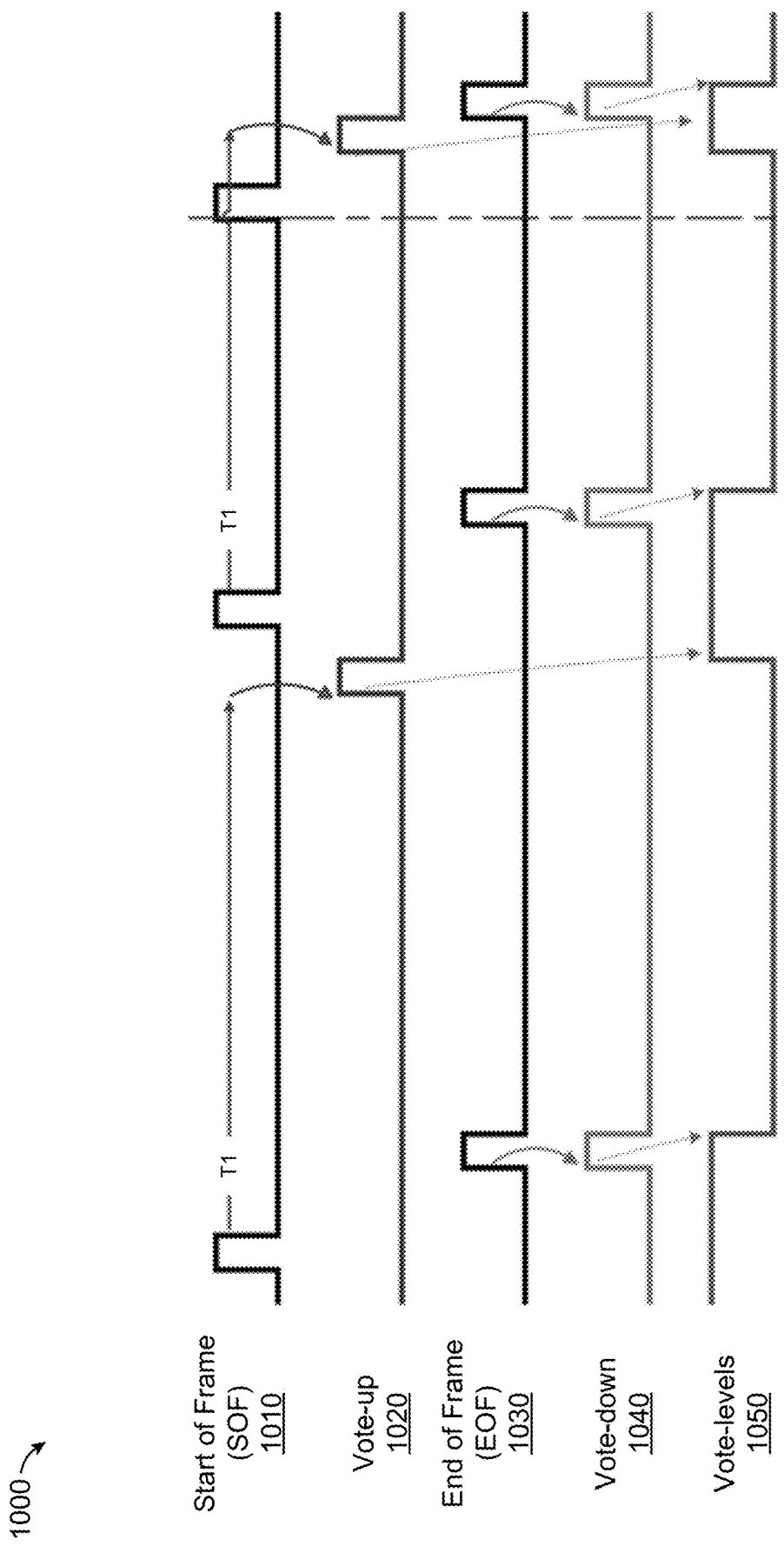
FIG. 10 is a diagram illustrating an example of timing for a camera using DRV for an FRS use case, where the DRV timer value and the frame rate are asynchronous, in accordance with some examples.

FIGS. 9 and 10 show timing for DRV for FRS use cases where the DRV timer value and the frame rate are synchronous and asynchronous, respectively. In particular, FIG. 9 is a diagram illustrating an example of timing 900 for a camera using DRV for an FRS use case, where the DRV timer value and the frame rate are synchronous. In FIG. 9, SOF timing 910, vote up timing 920, EOF timing 930, vote down timing 940, and vote levels timing 950 are shown.

In varying lighting conditions, the software programs the DRV timer value (e.g., T1, T2, and T3) for each of the three frames (e.g., as shown in the SOF timing 910). The timer value (e.g., T1, T2, or T3) should exactly match the corresponding data rate, or the frame rate (e.g., the FPS), which the sensor is sending. This matching will ensure that the vote up (in the vote up timing 920) occurs in time before the next SOF (e.g., in the SOF timing 910) arrives.

In FIG. 9, for each of the three frames (e.g., as denoted by the pulses in the SOF timing 910), the FPS (e.g., time between SOFs, denoted by the pulses in the SOF timing 910) keeps varying. For example, the time between the first SOF and the second SOF is larger than the time between the second SOF and the third SOF. As such, T1 is greater than T2.

For the example shown in FIG. 9, the timing 900 is working sufficiently. For example, the software will program T1, T2, and T3. When a timer (e.g., T1) expires, a corresponding vote up in the vote up timing 920 occurs. The vote level of the vote level timing 950 will go up following the vote up in the vote up timing 920. When an EOF (e.g., pulse) in the EOF timing 930 occurs, a corresponding vote down in the vote down timing 940 will occur. The vote level of the vote level timing 950 will go down following the vote down in the vote down timing 940. In this example, T1 and T2 are programmed correctly such that the vote level of the vote level timing 950 is up before the second SOF in the SOF timing 910 arrives.

FIG. 10 is a diagram illustrating an example of timing 1000 for a camera using DRV for an FRS use case, where the DRV timer value and the frame rate are asynchronous. In FIG. 10, SOF timing 1010, vote up timing 1020, EOF timing 1030, vote down timing 1040, and vote levels timing 1050 are shown.

In this example, because of the asynchronous nature between the DRV (e.g., DRV engine 830 of FIG. 8) and the sensor (e.g., sensor 870 of FIG. 8), the DRV timer (e.g., T1) does not match the corresponding frame rate of the sensor. Because of this asynchronous nature, a delay has happened inside the programming of the AHB. As such, the timer T1 is also used for the second frame as well as the third frame.

When the first timer (e.g., first T1 in SOF timing 1010) expires, a vote up in the vote up timing 1020 occurs. The vote level in the vote level timing 1050 follows this vote up and, as such, the second frame in the SOF timing 1010 can be received correctly.

However, the second timer (e.g., second T1 in SOF timing 1010) expires late such that a vote up happens after the third frame in the SOF timing 1010 arrives. The corresponding vote level of the voting levels timing 1050 is low when the third frame in the SOF timing 1010 arrives and, as such, the IFE and DDR are not ready to receive the third frame. As such, the third frame gets dropped.

In addition, the second vote up (e.g., second pulse) in the vote up timing 1020 occurs in the middle of the second frame of the SOF timing 1010. If hardware (e.g., the IFE) receives in the middle of a frame (e.g., receives an incomplete frame), this can lead to a hardware violation and a hardware hang (e.g., a fatal error) and, as such, the software will need to reset the hardware (e.g., the IFE). Therefore, an improved technique for DRV for a FSR for dynamic FPS use cases can be useful.

In one or more aspects, the systems and techniques provide DRV enhancements for dynamic FPS use cases. For instance, in some examples, the systems and techniques employ a timing indicator, such as a pre-start of frame (PRE-SOF) indicator, to stabilize voltage and clock levels of the ISP (e.g., an image front end component) and DDR after an increase in the ISP and DDR clock rate and power (e.g., which are increased from a vote up of the ISP and DDR by the DRV). A sensor (e.g., of the camera) sends this timing indicator to the DRV engine. The DRV engine will vote up the ISP and the DDR, based on the timing indicator. Since the sensor sends the timing indicator to the DRV engine, both the DRV vote up and the frame rate (e.g., image frame rate) will be synchronous, which can avoid the possibility of any mismatch between the DRV timer value and the corresponding frame rate. In one or more examples, the timing indicator (e.g., the PRE-SOF) can occur at a time prior to or after a start of a frame (SOF) of a plurality of image frames that are being processed.

Figure 11:
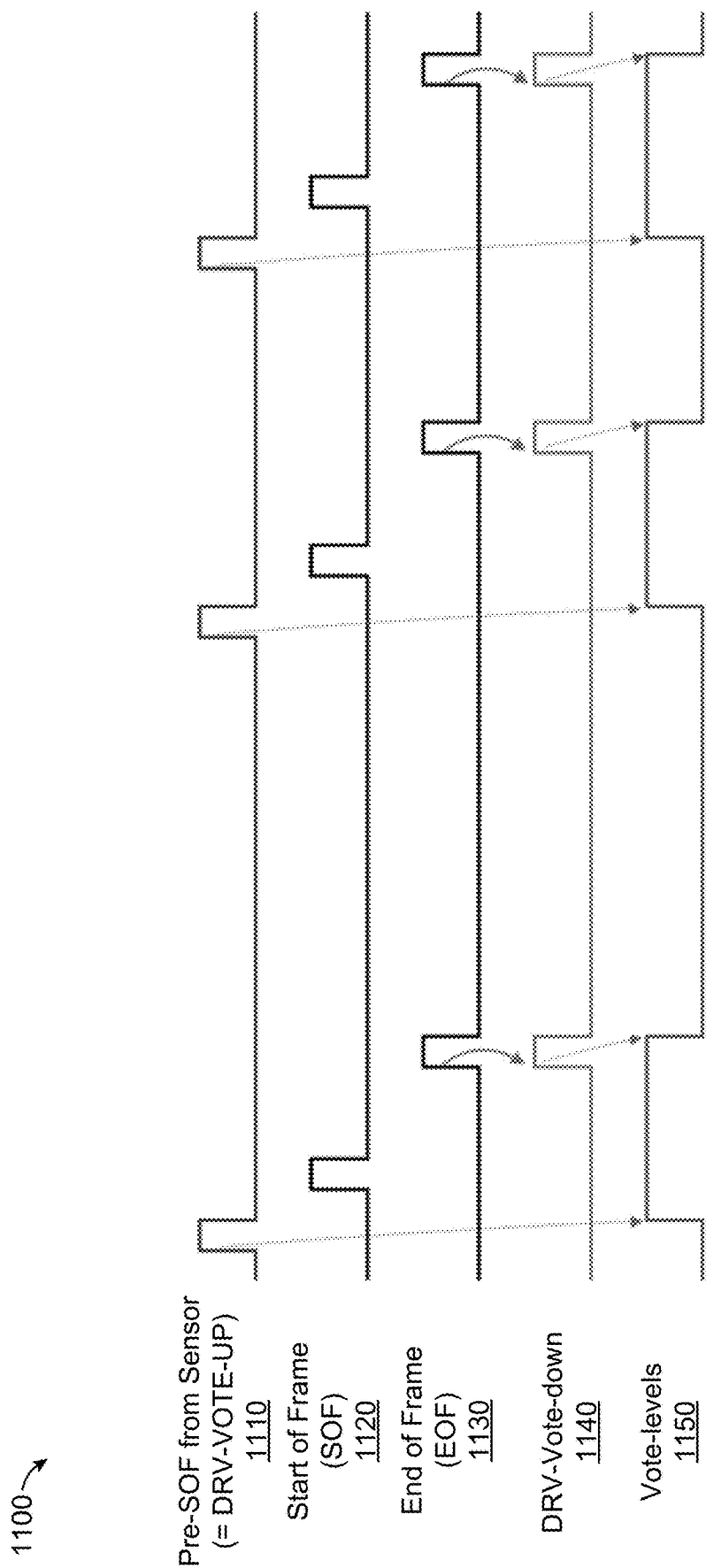
FIG. 11 is a diagram illustrating an example of timing for a camera using DRV for FRS use cases, where a timing indicator is employed, in accordance with some examples.

FIG. 11 is a diagram illustrating an example of timing 1100 for a camera using DRV for FRS use cases, where a timing indicator (e.g., shown as a PRE-SOF timing 1110) is employed. In FIG. 11, PRE-SOF timing 1110, SOF timing 1120, EOF timing 1130, vote down timing 1140, and vote levels timing 1150 are shown.

In FIG. 11, the PRE-SOF timing 1110 is shown to include timing indicators (e.g., PRE-SOFs, which are each denoted by a pulse in the PRE-SOF timing 1110). Each of the PRE-SOFs can be sent by a sensor (e.g., sensor 1220 of FIG. 12) via a user defined (UD) packet in the MIPI protocol. In one or more examples, each PRE-SOF may be sent prior to an SOF (e.g., denoted by pulses in the SOF timing 1120). Each PRE-SOF can be used to vote up the IFE and DDR vote levels (e.g., in the vote levels timing 1150).

In the PRE-SOF timing 1110, a PRE-SOF can be sent (e.g., can occur) at a time T (e.g., 0.5 ms) prior to an SOF (e.g., prior to a start of an image frame). This time T may be based on the amount of time required by the resources (e.g., the hardware, such as the IFE and DDR) to ensure that the voltage and clock levels are stable in the hardware before the next frame (e.g., SOF) arrives. The value of the time T can be programmed inside of the sensor, and can based on the SOC requirements and technical specifications that the particular SOC has been manufactured.

For this example, both the DRV vote up (e.g., via the PRE-SOF) and the frame rate (e.g., which is determined by the exposure ratio) are originating from the same source, which is the sensor. As such, the DRV vote up and the frame rate will be synchronized together. Since the DRV vote up and the frame rate are synchronized, there should be no mismatch between the DRV vote up and the frame rate. This synchronization should prevent any frame drop or a hardware violation. As such, this timing 1100 allows for DRV to be used for dynamic FPS use cases to save significant power.

FIG. 12 is a diagram illustrating an example of a system 1200 using DRV for a FSR for dynamic FPS use cases, where the system employs timing that includes a timing indicator (e.g., PRE-SOF 1231). In FIG. 12, the system 1200 is shown to include SW 1210, a DRV engine 1240 (e.g., a voting engine), an IFE 1250 (e.g., a front end component of a camera), a DDR 1260 (e.g., memory), a sensor 1220, and a camera serial interface (CSI) decoder 1230. In one or more examples, the DRV engine 1240, the IFE 1250, the DDR 1260, the sensor 1220, and/or the CSI decoder 1230 may be implemented on a SOC.

During operation of the system 1200, the sensor 1220 can obtain image frames capturing a scene. Depending on the changing lighting conditions, the SW 1210 can dynamically program the exposure ratio 1215 (e.g., Exp_ratio) inside the sensor 1220, which will change the frame rate (e.g., the FPS). The sensor 1220 can send (e.g., transmit) a timing indicator 1231 (e.g., a PRE-SOF) to the DRV engine 1240 (e.g., via the CSI decoder 1230) for synchronization of the DRV engine 1240 and the frame rate (e.g., the FPS) for processing image frames obtained by the sensor 1220. In one or more examples, the sensor 1220 can send the timing indicator 1231 (e.g., the SOFs) at T ms before each of the image frames 1221. The timing indicator 1231 (e.g., PRE-SOF) can be sent via a PRE-SOF packet, such as a UD packet with a particular data type (DT). The CSI decoder 1230 can use the DT defined inside the MIPI to distinguish whether the data it receives from the sensor 1220 is a timing indicator 1231 (e.g., a PRE-SOF) or an actual image (e.g., an image frame). As such, when the CSI decoder 1230 receives a timing indicator 1231 (e.g., a PRE-SOF), the CSI decoder 1230 can direct the timing indicator 1231 to the DRV engine 1240.

Once the DRV engine 1240 receives the timing indicator 1231 (e.g., PRE-SOF), the DRV engine 1240 can vote up the IFE 1250 and the DDR 1260. As such, the DRV engine 1240 can determine a vote up (e.g., a positive voting result) based on the timing indicator 1231 (e.g., PRE-SOF). A clock rate and voltage for a power source shared by the IFE 1250 and the DDR 1260 can be increased, based on the vote up (e.g., positive voting result), to produce an updated clock rate and an updated voltage. The updated clock rate and updated voltage can then be applied to the IFE 1250 and the DDR 1260.

The sensor 1220 can send (e.g., transmit) the SOF and the remaining image frames to the CSI 1230 decoder. The CSI decoder 1230 can send (e.g., transmit) the SOF and the remaining image frames to the IFE 1250. The IFE 1250 can process the image frames to produce processed image data. The IFE 1250 can send (e.g., transmit) the processed image data (e.g., processed image frames) to the DDR 1260. The DDR 1260 (e.g., memory) can store the processed image data (e.g., processed image frames). Since the IFE 1250 and the DDR 1260 have already been voted up, the IFE 1250 and the DDR 1260 are ready to accept the image frames and the processed image data, respectively.

In one or more aspects, the time between the timing indicator 1231 (e.g., PRE-SOF) and the start of a frame (e.g., SOF) can be configurable. FIGS. 13A and 13B show examples of timing indicators that occur at a time prior and after a start of an image frame (e.g., SOF), respectively. In particular, FIG. 13A is a diagram illustrating an example 1300 of a timing indicator (shown as $T_{PRE-SOF}$ 1302) for timing for a camera using DRV for a FSR for dynamic FPS use cases, where the timing indicator occurs at a time T prior to a start of an image frame (shown as $T_{SOF}$ 1304). At the beginning of the start of the use case, SW (e.g., SW 1210 of FIG. 12) can configure the value of the time T inside of the sensor (e.g., sensor 1220 of FIG. 12). This time T is the time prior to the SOF when the PRE-SOF packet should be sent (e.g., transmitted) by the sensor. The time T may be based on the amount of time required for the updated clock rate and updated clock voltage to stabilize in the IFE (e.g., IFE 1250 of FIG. 12) and DRV (e.g., DRV engine 1260 of FIG. 12).

Dynamically, in between image frames, the SW can change the exposure ratio (e.g., the FPS) inside the sensor. Based on the FPS, the sensor can calculate (e.g., using the formula: $T_{PRE-SOF}=T_{SOF}-T$) when the SOF (or the next frame) should be sent. The sensor can send the PRE-SOF at a time $T_{PRE-SOF}$ that is a time T prior to the time $T_{SOF}$ of the SOF. As such, the time T is configurable by the SW.

FIG. 13B is a diagram illustrating an example 1310 of a timing indicator (shown as $T_{PRE-SOF}$ 1314) for timing for a camera using DRV for a FSR for dynamic FPS use cases, where the timing indicator occurs at a time t after a start of an image frame (e.g., shown as $T_{SOF}$ 1312). Dynamically, in between the image frames, the SW (e.g., SW 1210 of FIG. 12) can program the exposure ratio and a timer value (e.g., equal to a time t) inside the sensor (e.g., sensor 1220). The time t can be based on lighting conditions of a scene of the image frames obtained by the sensor. When the sensor sends the SOF of the current frame, a timer value (e.g., equal to time t) starts. When the timer value expires, the sensor can send the PRE-SOF (e.g., via a UD packet).

Figures 14A, 14B:
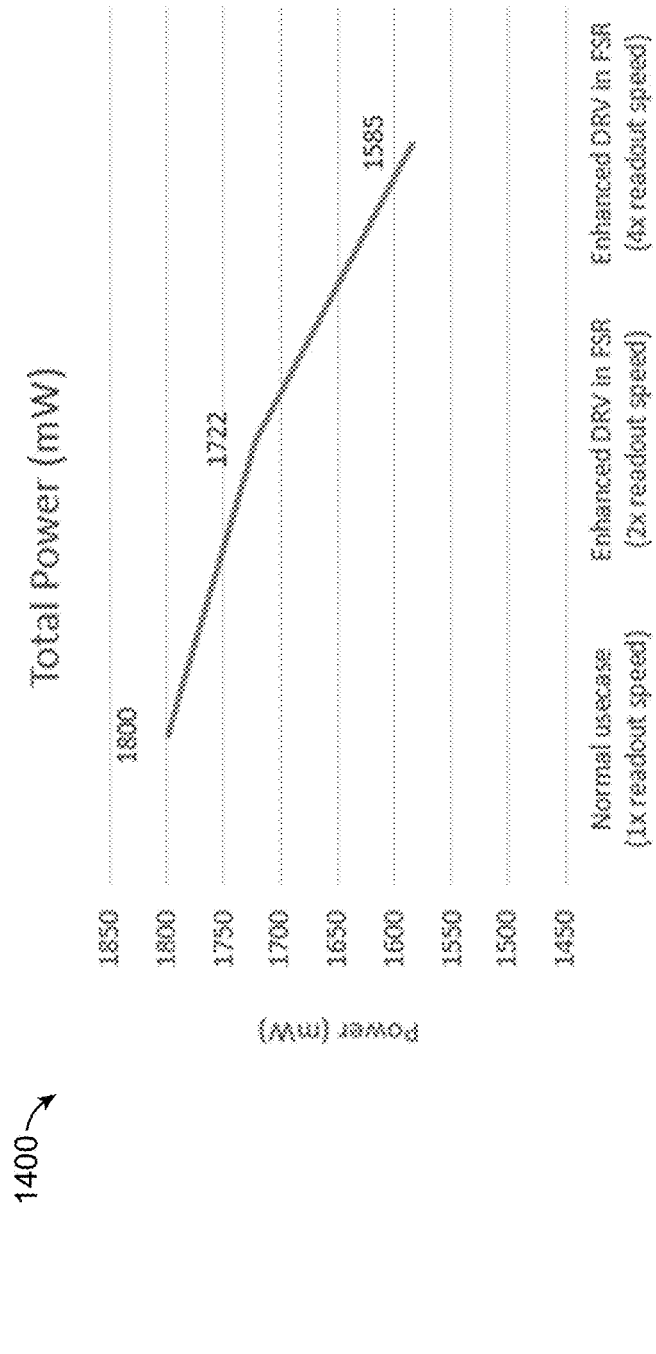
FIG. 14A is a graph illustrating an example of different power requirements for different sensor readout speeds when using DRV for a FSR for dynamic FPS use cases, in accordance with some examples.
FIG. 14B is a table summarizing the different power requirements for the different sensor readout speeds of FIG. 14A, in accordance with some examples.

This enhanced DRV mechanism, which uses a timing indicator (e.g., PRE-SOF), can reliably be used with dynamic FPS use cases to provide a significant power savings as shown in FIGS. 14A and 14B. Because of the use of the timing indicator (e.g., PRE-SOF), there can be a slight increase (e.g., 1.3%) in the power usage. However, this slight increase in power will be eclipsed by the very large savings in power obtained in the sensor, IFE, and DDR (e.g., due to the enhanced DRV mechanism). FIGS. 14A and 14B shows examples of the reduction in power by employing a timing indicator (e.g., PRE-SOF). In particular, FIG. 14A is a graph 1400 illustrating an example of different power requirements for different sensor readout speeds when using DRV for a FSR for dynamic FPS use cases. In FIG. 14A, for the graph 1400, the x-axis denotes readout speed, and the y-axis denotes power in milliwatts (mW).

As shown in the graph 1400 of FIG. 14, during a normal use case with a readout speed of 33 ms, the power consumption is approximately 1800 mW. When using an enhanced DRV mechanism in FSR with a two times (2×) readout speed, the power consumption lowers to approximately 1722 ms. When using an enhanced DRV mechanism in FSR with a four times (4×) readout speed, the power consumption lowers further to approximately 1585 ms.

FIG. 14B is a table 1410 summarizing the different power requirements for the different sensor readout speeds of FIG. 14A. In FIG. 14B, as shown in the table 1410, when the readout speed is double (e.g., a 2×readout speed), there can be a power savings of approximately 4.33%. When the readout speed is 4×, there can be a power savings of approximately 12%.

Figure 15:
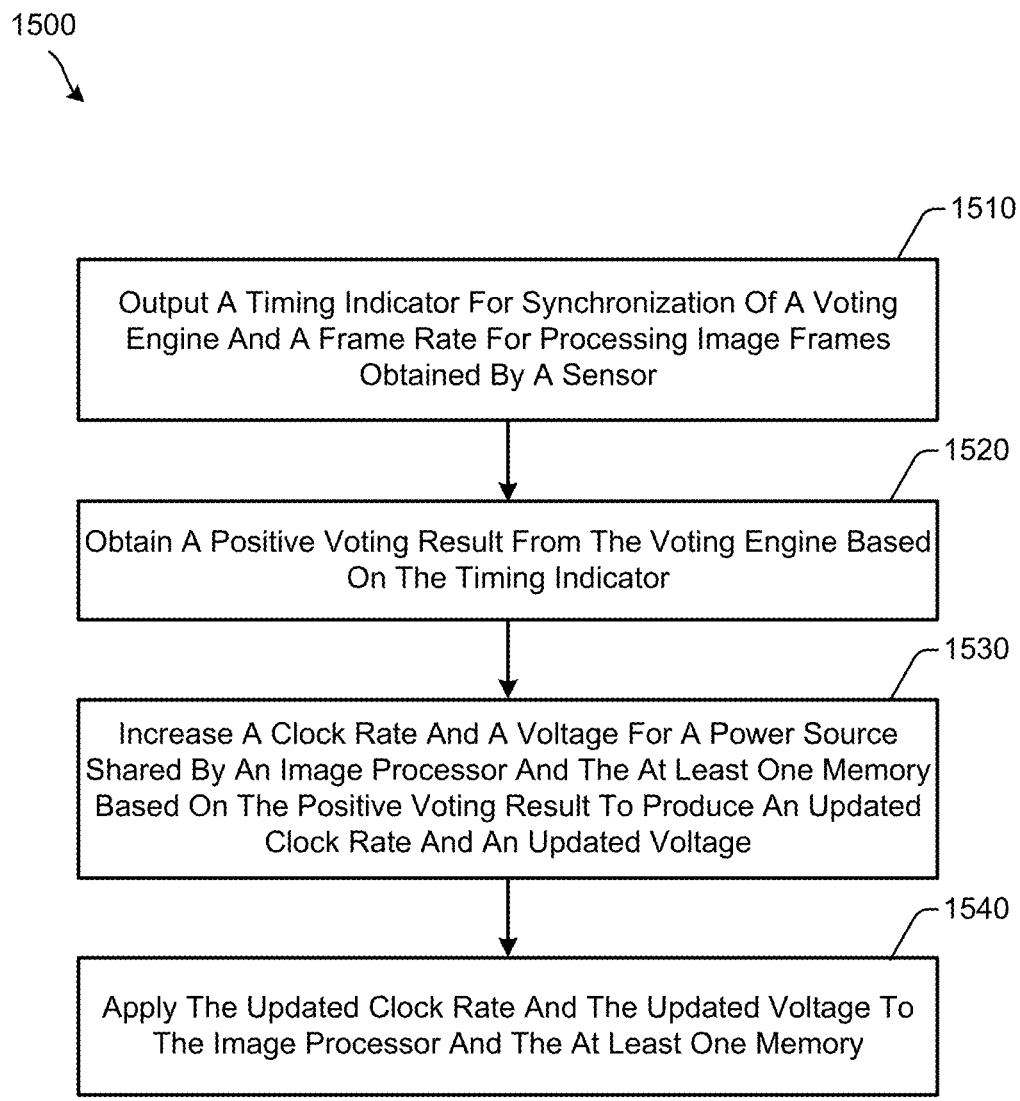
FIG. 15 is a flow diagram illustrating an example of a process for DRV for a FSR for dynamic FPS use cases, in accordance with some examples.

FIG. 15 is a flow chart illustrating an example of a process 1500 for DRV for a FSR for dynamic FPS use cases. The process 1500 can be performed by a computing device, or by a component or system (e.g., a chipset, one or more processors such as image processor(s), CPU(s), GPU(s), DSP(s), NPU(s), etc., one or more memory, any component thereof, and/or other component or system) of the computing device. The operations of the process 1500 may be implemented as software components that are executed and run on one or more processors (e.g., processor 1610 of FIG. 16 or other processor(s)).

At block 1510, the computing device (or component thereof) can output a timing indicator (e.g., the PRE-SOF timing 1110 of FIG. 11, the timing indicator 1231 of FIG. 12, the $T_{Pre-SOF}$ 1302 of FIG. 13A, the $T_{Pre-SOF}$ 1314 of FIG. 13B, or other timing indicator) for synchronization of a voting engine and a frame rate for processing image frames obtained by a sensor. In some cases, the computing device (or component thereof) can obtain, from the sensor, the image frames capturing a scene. In some aspects, the computing device can include the sensor and the voting engine. For instance, the sensor of the computing device can obtain (e.g., capture) the image frames capturing a scene and/or can transmit the timing indicator to the voting engine. In some examples, the timing indicator is transmitted (or output for transmission) via a user defined (UD) packet.

In some aspects, the timing indicator occurs a time prior to a start of an image frame of the image frames. For instance, as shown in FIG. 13A, a timing indicator (shown as $T_{PRE-SOF}$ 1302) for timing for a camera occurs at a time T prior to a start of an image frame (shown as $T_{SOF}$ 1304). In some aspects, the timing indicator occurs a time after a start of an image frame of the image frames. For example, as shown in FIG. 13B, a timing indicator (shown as $T_{PRE-SOF}$ 1314) for timing for a camera occurs at a time t after a start of an image frame (e.g., shown as $T_{SOF}$ 1312). In some cases, the time is based on an amount of time required for the updated clock rate and the updated voltage to stabilize in an image processor (e.g., of the computing device) and at least one memory (e.g., of the computing device). In some cases, the time is based on lighting conditions of a scene of the image frames.

At block 1520, the computing device (or component thereof) can obtain a positive voting result from the voting engine based on the timing indicator. For example, the voting engine can determine a positive voting result based on the timing indicator. In some cases, the voting engine is a dynamic resource voting (DRV) engine (e.g., the DRV 1240 of FIG. 12).

At block 1530, the computing device (or component thereof) can increase a clock rate and a voltage for a power source shared by the image processor and the at least one memory of the computing device based on the positive voting result to produce an updated clock rate and an updated voltage. In some aspects, the computing device can include the image processor. In some cases, the image processor is a front-end component of a camera (e.g., an image-front end (IFE), such as the IFE 1250 of FIG. 12). In some examples, the at least one memory is double data rate (DDR) memory (e.g., the DDR 1260 of FIG. 12).

At block 1540, the computing device (or component thereof) can apply the updated clock rate and the updated voltage to the image processor and the at least one memory. For example, as shown in FIG. 12, the DRV engine 1240 can receive the timing indicator 1231, and can vote up the IFE 1250 and the DDR 1260 based on the timing indicator 1231. Based on the vote up (e.g., positive voting result), a clock rate and voltage for a power source shared by the IFE 1250 and the DDR 1260 can be increased to produce an updated clock rate and an updated voltage. The updated clock rate and updated voltage can then be applied to the IFE 1250 and the DDR 1260.

In some aspects, the image processor can process the image frames to produce processed image data. In such aspects, the image processor can output the processed image data to the at least one memory. In some cases, the image processor and the at least one memory are on a system on a chip (SOC). For instance, as described with respect to FIG. 12, the sensor 1220 can send (e.g., transmit) the SOF and the remaining image frames to the CSI 1230 decoder, which can send (e.g., transmit) the SOF and the remaining image frames to the IFE 1250. The IFE 1250 can process the image frames to produce processed image data. The IFE 1250 can send (e.g., transmit) the processed image data (e.g., processed image frames) to the DDR 1260. The DDR 1260 (e.g., memory) can store the processed image data (e.g., processed image frames). Because the IFE 1250 and the DDR 1260 were previously voted up, the IFE 1250 and the DDR 1260 are ready to accept the image frames and the processed image data, respectively.

In some examples, the process 1500 may be performed by one or more computing devices or apparatuses. In some illustrative examples, the process 1500 can be performed by the image capture and processing system 100 of FIG. 1, the device 300 of FIG. 3, the system 1200 of FIG. 12, and/or one or more computing devices or systems (e.g., the computing system 1600 of FIG. 16). In some cases, such a computing device or apparatus may include a processor, microprocessor, microcomputer, or other component of a device that is configured to carry out the steps of the process 1500. In some examples, such computing device or apparatus may include one or more sensors configured to capture image data. For example, the computing device can include a smartphone, a head-mounted display, a mobile device, a camera, a tablet computer, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1500 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1500 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 16:
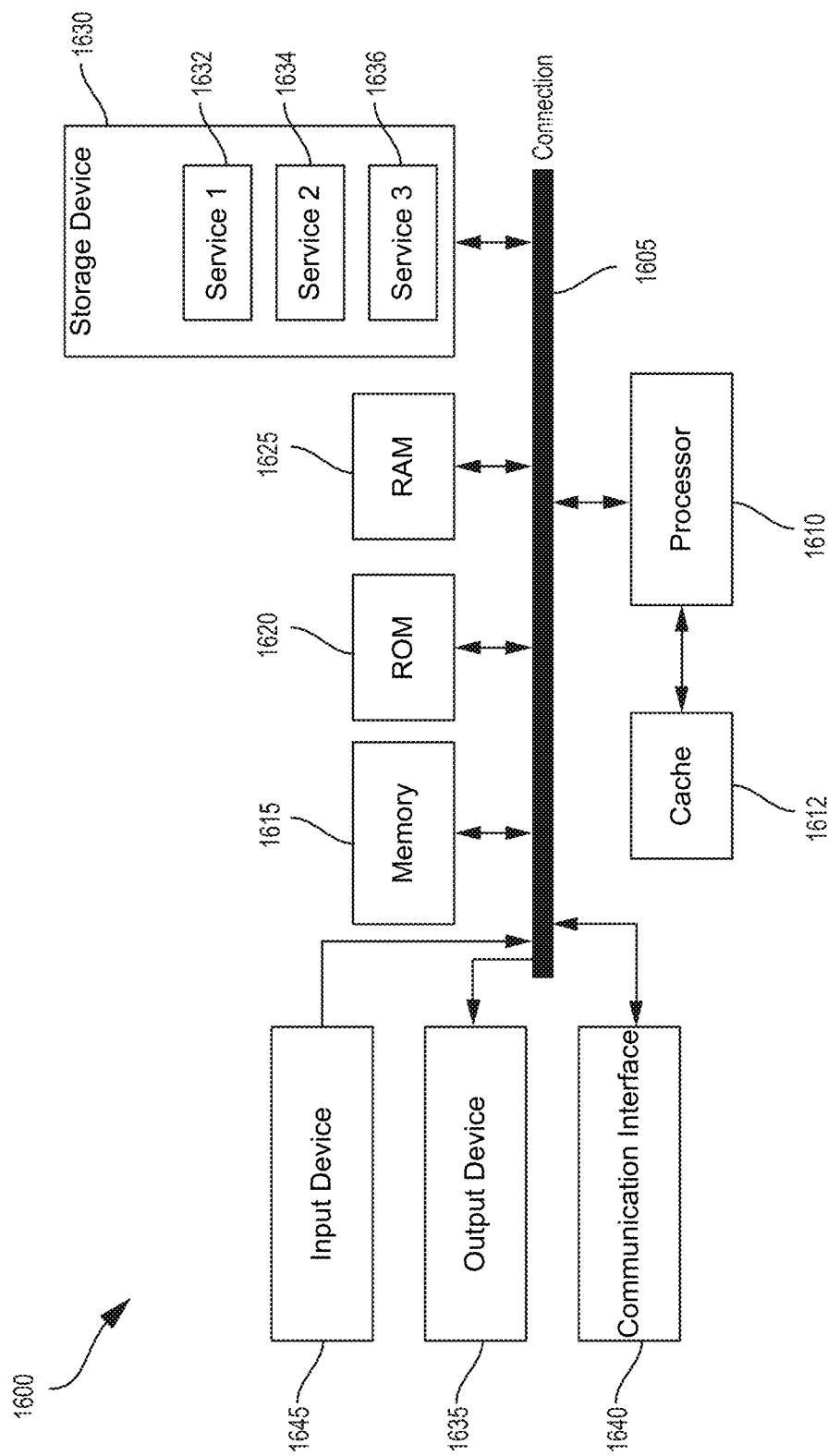
FIG. 16 is a diagram illustrating an example of a system for implementing certain aspects described herein.

FIG. 16 is a block diagram illustrating an example of a computing system 1600, which may be employed by the disclosed system for DRV enhancements for dynamic FPS use cases. In particular, FIG. 16 illustrates an example of computing system 1600, which can be for example any computing device making up internal computing system, a remote computing system, a camera, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some aspects, computing system 1600 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1600 includes at least one processing unit (CPU or processor) 1610 and connection 1605 that communicatively couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms. In some instances, multimodal systems can enable a user to provide multiple types of input/output to communicate with computing system 1600.

Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1640 may also include one or more range sensors (e.g., light-based sensors, radio frequency (RF)-based sensors, ultrasonic sensors, and infrared (IR) sensors) configured to collect data and provide measurements to processor 1610, whereby processor 1610 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some aspects, a hardware service that performs a particular function can include the software component stored in a computer-readable medium in connection with the necessary hardware components, such as processor 1610, connection 1605, output device 1635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image processing, the apparatus comprising: at least one memory; and at least one processor coupled to the at least one memory and configured to: output a timing indicator for synchronization of a voting engine and a frame rate for processing image frames obtained by a sensor; obtain a positive voting result from the voting engine based on the timing indicator; increase a clock rate and a voltage for a power source shared by an image processor and the at least one memory based on the positive voting result to produce an updated clock rate and an updated voltage; and apply the updated clock rate and the updated voltage to the image processor and the at least one memory.

Aspect 2. The apparatus of Aspect 1, wherein the timing indicator is output for transmission via a user defined (UD) packet.

Aspect 3. The apparatus of any one of Aspects 1 or 2, wherein the timing indicator occurs a time prior to a start of an image frame of the image frames.

Aspect 4. The apparatus of Aspect 3, wherein the time is based on an amount of time required for the updated clock rate and the updated voltage to stabilize in the image processor and the at least one memory.

Aspect 5. The apparatus of any one of Aspects 1 to 4, wherein the timing indicator occurs a time after a start of an image frame of the image frames.

Aspect 6. The apparatus of Aspect 5, wherein the time is based on lighting conditions of a scene of the image frames.

Aspect 7. The apparatus of any one of Aspects 1 to 6, wherein the at least one processor is configured to obtain, from the sensor, the image frames capturing a scene.

Aspect 8. The apparatus of any one of Aspects 1 to 7, wherein the image processor is a front end component of a camera.

Aspect 9. The apparatus of any one of Aspects 1 to 8, wherein the at least one memory is double data rate (DDR) memory.

Aspect 10. The apparatus of any one of Aspects 1 to 9, wherein the voting engine is a dynamic resource voting (DRV) engine.

Aspect 11. The apparatus of any one of Aspects 1 to 10, wherein the at least one processor includes the image processor.

Aspect 12. The apparatus of Aspect 11, wherein the image processor is configured to process the image frames to produce processed image data.

Aspect 13. The apparatus of Aspect 12, wherein the image processor is configured to output the processed image data to the at least one memory.

Aspect 14. The apparatus of any one of Aspects 11 to 13, wherein the image processor and the at least one memory are on a system on a chip (SOC).

Aspect 15. The apparatus of any one of Aspects 1 to 14, further comprising the sensor and the voting engine.

Aspect 16. A method for image processing, the method comprising: transmitting, by a sensor to a voting engine, a timing indicator for synchronization of the voting engine and a frame rate for processing image frames obtained by the sensor; determining, by the voting engine, a positive voting result based on the timing indicator; increasing a clock rate and a voltage for a power source shared by an image processor and memory based on the positive voting result to produce an updated clock rate and an updated voltage; and applying the updated clock rate and the updated voltage to the image processor and the memory.

Aspect 17. The method of Aspect 16, further comprising processing, by the image processor, the image frames to produce processed image data.

Aspect 18. The method of Aspect 17, further comprising transmitting, by the image processor, the processed image data to the memory.

Aspect 19. The method of any one of Aspects 16 to 18, wherein the timing indicator is transmitted via a user defined (UD) packet.

Aspect 20. The method of any one of Aspects 16 to 19, wherein the timing indicator occurs a time prior to a start of an image frame of the image frames.

Aspect 21. The method of Aspect 20, wherein the time is based on an amount of time required for the updated clock rate and the updated voltage to stabilize in the image processor and the memory.

Aspect 22. The method of any one of Aspects 16 to 21, wherein the timing indicator occurs a time after a start of an image frame of the image frames.

Aspect 23. The method of Aspect 22, wherein the time is based on lighting conditions of a scene of the image frames.

Aspect 24. The method of any one of Aspects 16 to 23, further comprising obtaining, by the sensor, the image frames capturing a scene.

Aspect 25. The method of any one of Aspects 16 to 24, wherein the image processor is a front end component of a camera.

Aspect 26. The method of any one of Aspects 16 to 25, wherein the memory is double data rate (DDR) memory.

Aspect 27. The method of any one of Aspects 16 to 26, wherein the voting engine is a dynamic resource voting (DRV) engine.

Aspect 28. The method of any one of Aspects 16 to 27, wherein the image processor and the memory are on a system on a chip (SOC).

Aspect 29. A non-transitory computer-readable medium having stored thereon instructions that, when executed by one or more processors, cause the one or more processors to perform operations according to any of Aspects 16 to 28.

Aspect 30. An apparatus for image processing, the apparatus including one or more means for performing operations according to any of Aspects 16 to 28.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:
    at least one memory; and
    at least one processor coupled to the at least one memory and configured to:
        output a timing indicator for synchronization of a voting engine and a frame rate for processing image frames obtained by a sensor;
        obtain a positive voting result from the voting engine based on the timing indicator;
        increase a clock rate and a voltage for a power source shared by an image processor and the at least one memory based on the positive voting result to produce an updated clock rate and an updated voltage; and
        apply the updated clock rate and the updated voltage to the image processor and the at least one memory.

2. The apparatus of claim 1, wherein the timing indicator is output for transmission via a user defined (UD) packet.

3. The apparatus of claim 1, wherein the timing indicator occurs at a time prior to a start of an image frame of the image frames.

4. The apparatus of claim 3, wherein the time is based on an amount of time required for the updated clock rate and the updated voltage to stabilize in the image processor and the at least one memory.

5. The apparatus of claim 1, wherein the timing indicator occurs at a time after a start of an image frame of the image frames.

6. The apparatus of claim 5, wherein the time is based on lighting conditions of a scene of the image frames.

7. The apparatus of claim 1, wherein the at least one processor is configured to obtain, from the sensor, the image frames capturing a scene.

8. The apparatus of claim 1, wherein the image processor is a front end component of a camera.

9. The apparatus of claim 1, wherein the at least one memory is double data rate (DDR) memory.

10. The apparatus of claim 1, wherein the voting engine is a dynamic resource voting (DRV) engine.

11. The apparatus of claim 1, wherein the at least one processor includes the image processor.

12. The apparatus of claim 11, wherein the image processor is configured to process the image frames to produce processed image data.

13. The apparatus of claim 12, wherein the image processor is configured to output the processed image data to the at least one memory.

14. The apparatus of claim 11, wherein the image processor and the at least one memory are on a system on a chip (SOC).

15. The apparatus of claim 1, further comprising the sensor and the voting engine.

16. A method for image processing, the method comprising:
- transmitting, by a sensor to a voting engine, a timing indicator for synchronization of the voting engine and a frame rate for processing image frames obtained by the sensor;
- determining, by the voting engine, a positive voting result based on the timing indicator;
- increasing a clock rate and a voltage for a power source shared by an image processor and memory based on the positive voting result to produce an updated clock rate and an updated voltage; and
- applying the updated clock rate and the updated voltage to the image processor and the memory.

17. The method of claim 16, further comprising processing, by the image processor, the image frames to produce processed image data.

18. The method of claim 17, further comprising transmitting, by the image processor, the processed image data to the memory.

19. The method of claim 16, wherein the timing indicator is transmitted via a user defined (UD) packet.

20. The method of claim 16, wherein the timing indicator occurs at a time prior to a start of an image frame of the image frames.

21. The method of claim 20, wherein the time is based on an amount of time required for the updated clock rate and the updated voltage to stabilize in the image processor and the memory.

22. The method of claim 16, wherein the timing indicator occurs at a time after a start of an image frame of the image frames.

23. The method of claim 22, wherein the time is based on lighting conditions of a scene of the image frames.

24. The method of claim 16, further comprising obtaining, by the sensor, the image frames capturing a scene.

25. The method of claim 16, wherein the image processor is a front end component of a camera.

26. The method of claim 16, wherein the memory is double data rate (DDR) memory.

27. The method of claim 16, wherein the voting engine is a dynamic resource voting (DRV) engine.

28. The method of claim 16, wherein the image processor and the memory are on a system on a chip (SOC).

* * * * *